US012027094B2

(12) United States Patent
Kim et al.

(10) Patent No.: US 12,027,094 B2
(45) Date of Patent: Jul. 2, 2024

(54) DATA DRIVER AND DISPLAY DEVICE HAVING SAME

(71) Applicant: Samsung Display Co., Ltd., Yongin-Si (KR)

(72) Inventors: Sooyeon Kim, Namyangju-si (KR); Hee-Jeong Seo, Hwaseong-si (KR); Jiye Lee, Suwon-si (KR); Taegon Im, Seongnam-si (KR); Junghwan Cho, Asan-si (KR)

(73) Assignee: Samsung Display Co., Ltd., Yongin-Si (KR)

(*) Notice: Subject to any disclaimer, the term of this patent is extended or adjusted under 35 U.S.C. 154(b) by 0 days.

(21) Appl. No.: 17/115,838

(22) Filed: Dec. 9, 2020

(65) Prior Publication Data

US 2021/0287594 A1 Sep. 16, 2021

(30) Foreign Application Priority Data

Mar. 16, 2020 (KR) ........................ 10-2020-0031780

(51) Int. Cl.
*G09G 3/3275* (2016.01)
*G09G 3/20* (2006.01)

(52) U.S. Cl.
CPC ..... *G09G 3/2092* (2013.01); *G09G 2310/027* (2013.01); *G09G 2310/0275* (2013.01)

(58) Field of Classification Search
CPC ........... G09G 3/2092; G09G 2310/027; G09G 2310/0275; G09G 2300/0426; G09G 3/2096; G09G 3/3644; G09G 2310/0291; G09G 2320/0223; G09G 2320/0233; G09G 3/32; G09G 2310/0243; G09G 2310/0262; G09G 2310/0264
See application file for complete search history.

(56) References Cited

U.S. PATENT DOCUMENTS

| | | | | |
|---|---|---|---|---|
| 9,892,701 | B2 | 2/2018 | Park et al. | |
| 10,297,221 | B2 | 5/2019 | Hwang et al. | |
| 10,636,375 | B2 | 4/2020 | Jo et al. | |
| 10,984,701 | B2 * | 4/2021 | Huang | G09G 3/3685 |
| 2003/0201959 | A1 * | 10/2003 | Sakaguchi | G09G 3/3696 345/87 |
| 2007/0103422 | A1 * | 5/2007 | Wu | G09G 3/2096 345/100 |

(Continued)

FOREIGN PATENT DOCUMENTS

| | | | |
|---|---|---|---|
| KR | 10-20160048303 | A | 5/2016 |
| KR | 10-20170015749 | A | 2/2017 |

(Continued)

*Primary Examiner* — Jose R Soto Lopez
(74) *Attorney, Agent, or Firm* — Innovation Counsel LLP

(57) ABSTRACT

Provided is a data driver including a digital to analog converter configured to convert image signal data into a plurality of data voltages, and an output buffer unit including a plurality of channels for outputting the plurality of data voltages. The output buffer unit includes a plurality of output blocks. Each output block includes one or more channels. Data voltages outputted from a first output block among the plurality of output blocks are delayed with a first time difference. Data voltages outputted from a second output block among the plurality of output blocks are delayed with a second time difference which is different from the first time difference.

15 Claims, 17 Drawing Sheets

(56) References Cited

U.S. PATENT DOCUMENTS

2007/0152947 A1* 7/2007 Tanaka .................. G09G 5/001 345/100
2008/0062100 A1* 3/2008 Hong .................. G09G 3/3696 345/87
2008/0239184 A1* 10/2008 Kim .................. G09G 3/3696 349/41
2009/0040242 A1* 2/2009 Tomizawa .......... G09G 3/3614 345/690
2009/0079477 A1* 3/2009 Lee .................. H03L 7/0816 327/149
2010/0123704 A1* 5/2010 Nishimizu .......... G09G 3/3688 345/211
2011/0316821 A1* 12/2011 Suzuki .................. G09G 3/3688 345/204
2012/0026154 A1* 2/2012 Tsuchi .................. H03M 1/66 345/212
2012/0162165 A1* 6/2012 Lee .................. G09G 3/006 345/206
2012/0162185 A1* 6/2012 Park .................. G09G 3/3611 345/212
2012/0235964 A1* 9/2012 Kim .................. G09G 3/20 345/204
2012/0242722 A1* 9/2012 Ishii .................. G09G 3/3685 345/691
2014/0078190 A1* 3/2014 Wu .................. H05K 3/36 29/831
2014/0253532 A1* 9/2014 Woo .................. G09G 5/00 345/212
2016/0035307 A1* 2/2016 Jeon .................. G09G 3/20 345/82
2016/0035321 A1* 2/2016 Cho .................. G09G 3/2092 345/213
2016/0063957 A1* 3/2016 Shirasaki .............. G11C 19/28 345/213
2016/0267871 A1 9/2016 Kim et al.
2017/0011703 A1* 1/2017 Higuchi .............. G09G 3/3674
2017/0092201 A1 3/2017 Seo et al.
2017/0115798 A1* 4/2017 Ho .................. G06F 3/04184
2017/0323611 A1* 11/2017 Jo .................. G09G 3/3677
2019/0051337 A1* 2/2019 Jo .................. G09G 3/20

FOREIGN PATENT DOCUMENTS

KR 10-2017-0037772 A 4/2017
KR 10-2017-0126568 A 11/2017
KR 10-1818550 B1 1/2018
KR 10-20190018119 A 2/2019

* cited by examiner

DATA DRIVER AND DISPLAY DEVICE HAVING SAME

CROSS-REFERENCE TO RELATED APPLICATIONS

This U.S. non-provisional patent application claims priority under 35 U.S.C. § 119 of Korean Patent Application No. 10-2020-0031780, filed on Mar. 16, 2020, the entire contents of which are hereby incorporated by reference.

BACKGROUND

1. Field

The present disclosure relates to a data driver and a display device having the same, and more particularly, to a data driver that can improve charging failure due to signal delay and a display device having the same.

2. Description of the Related Art

A display device includes a display panel for displaying an image and a data driver and gate driver for driving the display panel. The display panel includes a plurality of gate lines, a plurality of data lines, and a plurality of pixels.

The data driver outputs a data driving signal to the data lines and the gate driver outputs a gate driving signal for driving the gate lines. After applying a gate signal to a pixel connected to the gate line, the display device may display an image using a data voltage corresponding to the display image.

Recently, as the size of a display panel is increased, and a high-speed driving method is adopted, signal delay can occur on a delivery path of a gate signal outputted from a gate driver. In this case, a charge rate of pixels located far from the gate driver may be lower than a charge rate of pixels located near. Thus, there is need to develop a novel device and method to improve charging capability.

SUMMARY

The present disclosure is to provide a data driver capable of improving charging failure due to signal delay.

The present disclosure is also to provide a display device having the above-described data driver.

An embodiment of the present disclosure provides a data driver including a digital to analog converter configured to convert image signal data into a plurality of data voltages; and an output buffer unit including a plurality of channels for outputting the plurality of data voltages. The output buffer unit includes a plurality of output blocks, and each of the plurality of output blocks includes at least one channel.

In an embodiment, first data voltages outputted from the first output block among the plurality of output blocks are delayed with a first time difference, and second data voltages output from the second output block among the plurality of output blocks are delayed with a second time difference which is different from the first time difference.

In an embodiment of the present disclosure, a display device includes: a display panel including a plurality of pixels connected to a plurality of gate lines and a plurality of data lines; a gate driver configured to generate a plurality of gate signals and apply the plurality of gate signals to the plurality of gate lines; at least one data integrated circuits configured to generate a plurality of data voltages based on image signal data and apply the plurality of data voltages to the plurality of data lines; and a signal controller configured to control the gate driver and the data integrated circuit and generate the image signal data based on image data.

In an embodiment, the data integrated circuit includes a plurality of output blocks connected to the data lines, and each of the plurality of output blocks includes at least one channel.

In an embodiment, first data voltages outputted from the first output block among the plurality of output blocks are delayed with a first time difference, and second data voltages outputted from the second output block among the plurality of output blocks are delayed with a second time difference which is different from the first time difference.

In an embodiment of the present disclosure, a display device includes: a display panel including a plurality of pixels connected to a plurality of gate lines and a plurality of data lines; a gate driver configured to generate a plurality of gate signals and apply the plurality of gate signals to the plurality of gate lines; and a plurality of data integrated circuits configured to generate a plurality of data voltages based on image signal data and apply the plurality of data voltages to the plurality of data lines.

In an embodiment, each of the plurality of data integrated circuits includes a plurality of output blocks connected to the plurality of data lines, and first data voltages outputted from at least one first output block of the first data integrated circuit among the plurality of data integrated circuits have equal first delay value.

BRIEF DESCRIPTION OF THE FIGURES

The accompanying drawings are included to provide a further understanding of the present disclosure, and are incorporated in and constitute a part of this specification. The drawings illustrate example embodiments of the present disclosure and, together with the description, serve to explain principles of the present disclosure. In the drawings.

DETAILED DESCRIPTION

Figure 1:
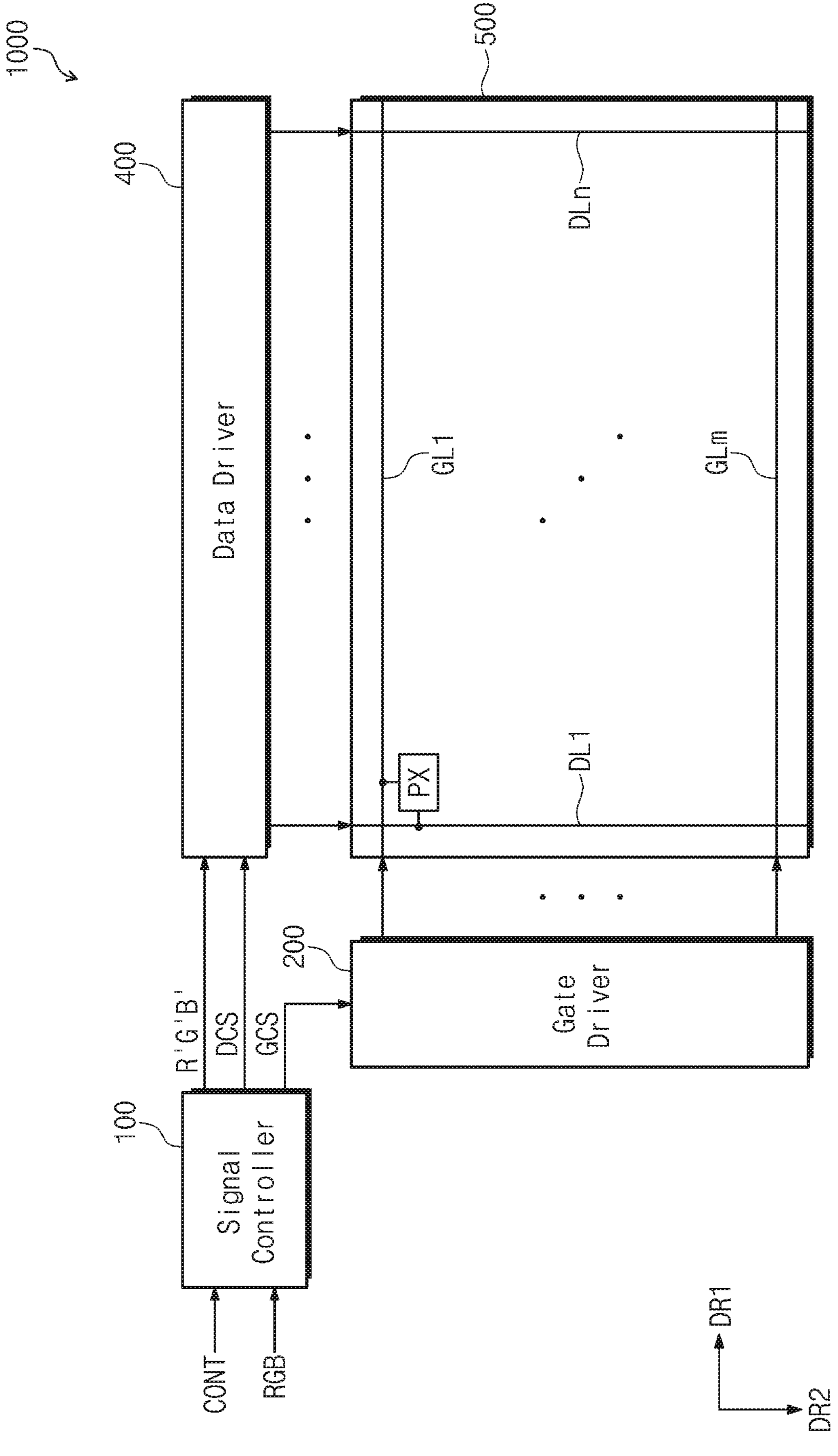
FIG. 1 is a block diagram of a display device according to an embodiment of the present disclosure.

In this specification, when it is mentioned that a component (or, an area, a layer, a part, etc.) is referred to as being "on", "connected to" or "combined to" another component, this means that the component may be directly on, connected to, or combined to the other component or a third component therebetween may be present.

Like reference numerals refer to like elements. Additionally, in the drawings, the thicknesses, proportions, and dimensions of components are exaggerated for effective description.

"And/or" includes all of one or more combinations defined by related components.

It will be understood that the terms "first" and "second" are used herein to describe various components but these components should not be limited by these terms. The above terms are used only to distinguish one component from another. For example, a first component may be referred to as a second component and vice versa without departing from the scope of the present disclosure. The terms of a singular form may include plural forms unless otherwise specified.

In addition, terms such as "below", "the lower side", "on", and "the upper side" are used to describe a relationship of configurations shown in the drawing. The terms are described as a relative concept based on a direction shown in the drawing.

Unless otherwise defined, all terms (including technical and scientific terms) used herein have the same meaning as terms commonly understood by those skilled in the art to which this invention belongs. In general, the terms defined in the dictionary should be considered to have the same meaning as the contextual meaning of the related art, and, unless clearly defined herein, should not be understood abnormally or as having an excessively formal meaning.

In various embodiments of the present disclosure, the term "include," "comprise," "including," or "comprising," specifies a property, a region, a fixed number, a step, a process, an element and/or a component but does not exclude other properties, regions, fixed numbers, steps, processes, elements and/or components.

Hereinafter, another embodiment of the present disclosure will be described with reference to the drawings.

FIG. 1 is a block diagram of a display device according to an embodiment of the present disclosure.

Referring to FIG. 1, the display device 1000 includes a signal controller 100, a gate driver 200, a data driver 400, and a display panel 500.

The display panel 500 includes a plurality of pixels PX connected to a plurality of gate lines GL1 to GLm and a plurality of data lines DL1 to DLn, and displays an image based on the output image data R'G'B'. The plurality of gate lines GL1 to GLm extend in a first direction DR1, and the plurality of data lines DL1 to DLn extend in a second direction DR2 intersecting the first direction DR1. The plurality of pixels PX are arranged in a matrix form, and each of the plurality of pixels PX may be electrically connected to one of the plurality of gate lines GL1 to GLm and one of the plurality of data lines DL1 to DLn.

The signal controller 100 controls the operation of the gate driver 200 and the data driver 400. The signal controller 100 receives input image data RGB and an input control signal CONT from an external device (e.g., a host). The input image data RGB may include red gradation data R, green gradation data G, and blue gradation data B for each of the pixels PX. The input control signal CONT may include a master clock signal, a data enable signal, a vertical synchronization signal, and a horizontal synchronization signal.

The signal controller 100 generates an image data signal R'G'B', a gate control signal GCS, and a data control signal DCS based on the input image data RGB and the input control signal CONT.

Specifically, the signal controller 100 may generate the image data signal R'G'B' based on the input image data RGB and provide the generated image data signal R'G'B' to the data driver 400. The image data signal R'G'B' may be corrected image data generated by correcting the input image data RGB. According to an embodiment, the signal controller 100 may perform image quality correction, spot correction, color characteristic compensation, and/or active capacitance compensation for the input image data RGB.

Also, the signal controller 100 may generate a gate control signal GCS for controlling the operation of the gate driver 200 based on the input control signal CONT and provide the generated gate control signal GCS to the gate driver 200. The gate control signal GCS may include a vertical start signal and a gate clock signal. The signal controller 100 may generate a data control signal DCS for controlling the operation of the data driver 400 based on the input control signal CONT and provide the generated data control signal DCS to the data driver 400. The data control signal DCS may include a horizontal start signal, a data clock signal, a data load signal, a polarity control signal, and output control signals.

The gate driver 200 generates gate signals for driving the plurality of gate lines GL1 to GLm based on the gate control signal GCS. The gate driver 200 may sequentially apply gate signals to the plurality of gate lines GL1 to GLm. Accordingly, the plurality of pixels PX may be sequentially driven in units of pixels (i.e., pixel row units) connected to the same gate line.

The data driver 400 receives the data control signal DCS and the image data signal R'G'B' from the signal controller 100. The data driver 400 generates analog data voltages based on the data control signal DCS and the digital image data signal R'G'B'. The data driver 400 may sequentially apply data voltages to the plurality of data lines DL1 to DLn.

According to an embodiment, the gate driver 200 and/or the data driver 400 is mounted on the display panel 500 in the form of a chip, or may be connected to the display panel 500 in the form of a tape carrier package (TCP) or a chip on film (COF). According to the embodiment, the gate driver 200 and/or the data driver 400 may be integrated in the display panel 500.

The gate driver 200 is provided on one or both sides of the display panel 500 to sequentially apply gate signals to the gate lines GL1 to GLm. FIG. 1 illustrates a structure in which the gate driver 200 is connected to one end of the gate lines GL1 to GLm on one side of the display panel 500. However, the present disclosure is not limited thereto, and the display device 1000 may have a dual gate structure in which the gate driver 200 is connected to both sides of the gate lines GL1 to GLm.

Figure 2:
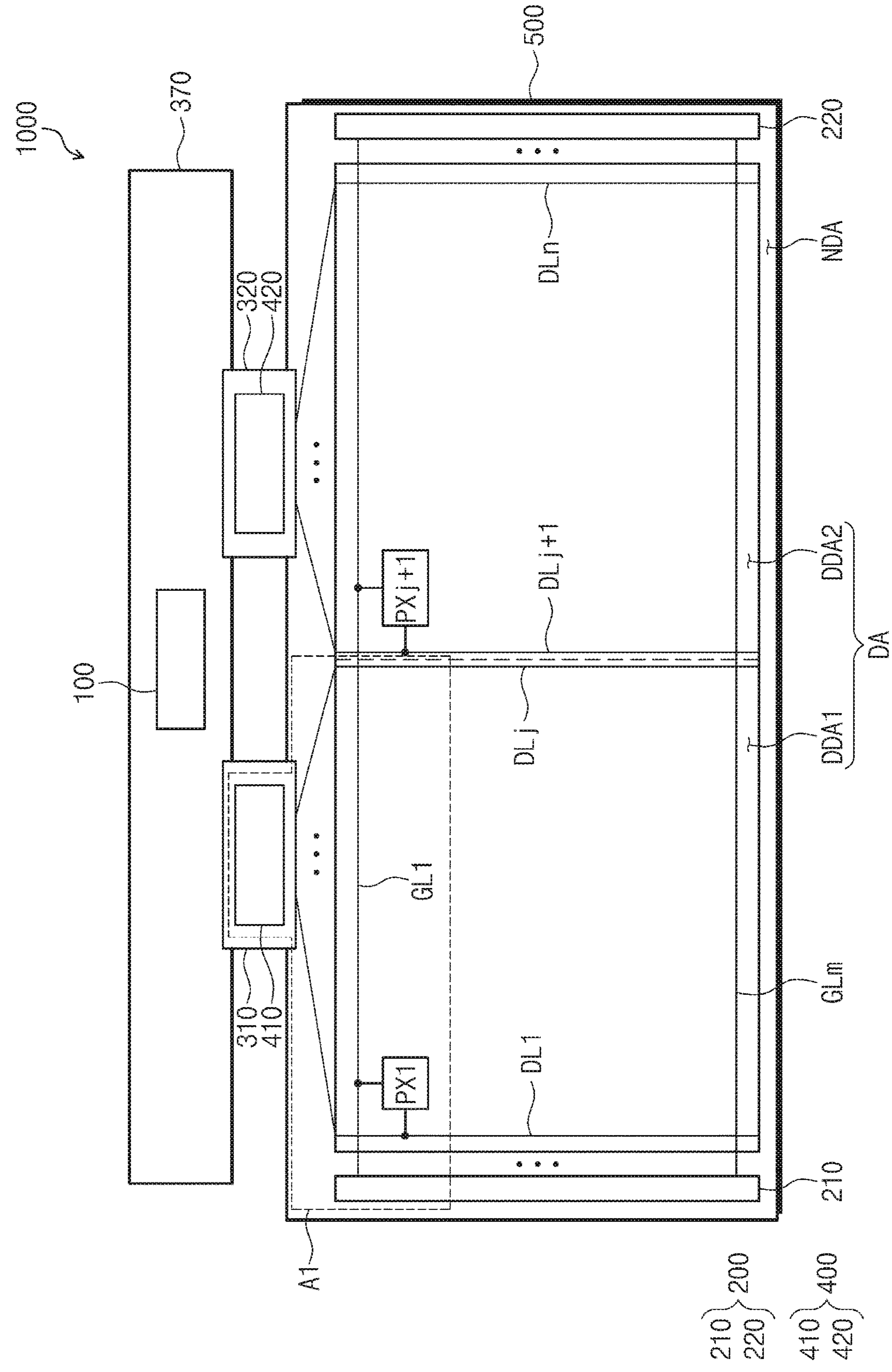
FIG. 2 is a plan view of a display device according to an embodiment of the present disclosure.

FIG. 2 is a plan view of a display device according to an embodiment of the present disclosure.

Referring to FIG. 2, in the display device 1000 according to an embodiment of the present disclosure, the gate driver 200 includes a first gate driving circuit 210 and a second gate driving circuit 220. The first gate driving circuit 210 is connected to first end of each of the gate lines GL1 to GLm, and the second gate driving circuit 220 is connected to second end of each of the gate lines GL1 to GLm.

Each of the first and second gate driving circuits 210 and 220 may include a shift register that sequentially outputs a gate signal. The first and second gate driving circuits 210 and 220 may operate simultaneously to output gate signals to the same gate line simultaneously. Accordingly, each of the gate lines GL1 to GLm may receive gate signals from the first and second gate driving circuits 210 and 220 through the first and second ends.

Here, the gate signal output from the first gate driving circuit 210 may be delayed toward the center from the first end of each of the gate lines GL1 to GLm, and the gate signal from the second gate driving circuit 220 may be delayed toward the center from the second end of each of the gate lines GL1 to GLm. Specifically, a difference occurs between a time point at which the gate signal reaches the pixels adjacent to the first end of each gate line and a time point (hereinafter, turn-on time point) at which the gate signal reaches the pixels adjacent to the center (e.g., the (k+1)-th pixel PXk+1).

For example, a time point when a pixel (hereinafter, a first pixel PX1) connected to the first gate line GL1 and the first data line DL1 is turned on in response to the first gate signal may be different from a time point at which pixels connected to the first gate line GL1 and the (j+1)-th data line DLj+1 (hereinafter, the (j+1)-th pixel PXj+1) are turned on in response to the first gate signal. That is, the turn-on time point of the (k+1)-th pixel PXj+1 may be delayed by a predetermined time from the turn-on time point of the first pixel PX1. The delay time of the gate signal may vary depending on the line resistance of each gate line.

As described above, according to the line resistance of each gate line, a variation in turn-on time between pixels may occur depending on the position. In addition, when a variation in turn-on time occurs between pixels included in the same pixel row, a problem that a charging rate of a pixel that is turned on relatively slowly is lowered may occur.

In order to improve the charging rate reduction problem, the data driver 400 may adjust the time point at which data voltages are outputted in consideration of the line resistance of each gate line.

Referring to FIG. 2, the data driver 400 may include a first data integrated circuit 410 and a second data integrated circuit 420. In FIG. 2, it is shown that the data driver 400 has a structure including two data integrated circuits 410 and 420, but the present disclosure is not limited thereto. That is, the data driver 400 may include three or more data integrated circuits or one data integrated circuit.

According to an embodiment, the display device 1000 may further include flexible circuit boards 310 and 320 in which the data integrated circuits 410 and 420 are mounted in a TCP manner, and a printed circuit board 370 electrically connected to the flexible circuit boards 310 and 320. Specifically, the display device 1000 includes a first flexible circuit board 310 on which the first data integrated circuit 410 is mounted and a second flexible circuit board 320 on which the second data integrated circuit 420 is mounted.

The first and second flexible circuit boards 310 and 320 electrically connect the display panel 500 and the printed circuit board 370 and are disposed therebetween. Specifically, one end of each of the first and second flexible circuit boards 310 and 320 may be coupled to the printed circuit board 370, and the other end of each of the first and second flexible circuit boards 310 and 320 may be coupled to the display panel 500.

The display panel 500 includes a display area DA displaying an image and a non-display area NDA adjacent to the periphery of the display area DA.

The display panel 500 may include a plurality of pixels PX1 and PXk+1 disposed in the display area DA. Also, the display panel 500 includes gate lines GL1 to GLm and data lines DL1 to DLj and DLj+1 to DLn, which are insulated from the gate lines GL1 to GLm and cross the gate lines GL1 to GLm.

In this case, the first and second flexible circuit boards 310 and 320 may be connected to a non-display area NDA of the display panel 500 adjacent to the printed circuit board 300. Although not shown in the drawing, the data integrated circuits 410 and 420 may be directly mounted on the non-display area NDA of the display panel 500 in a chip on glass (COG) method.

The first data integrated circuit 410 may be connected to the first group of data lines DL1 to DLj among the data lines DL1 to DLj and DLj+1 to DLn, and the second data integrated circuit 420 may be connected to the second group of data lines DLj+1 and DLn among the data lines DL1 to DLj and DLj+1 to DLn. Here, j may be a number corresponding to ½ of n. Here, the display area DA may include a first driving area DDA1 in which the first group of data lines DL1 to DLj is disposed and a second driving area DDA2 in which the second group of data lines DLj+1 to DLn is disposed. The pixels disposed in the first driving area DDA1 may be driven by the first data integrated circuit 410, and the pixels disposed in the second driving area DDA2 may be driven by the second data integrated circuit 420.

Figure 3:
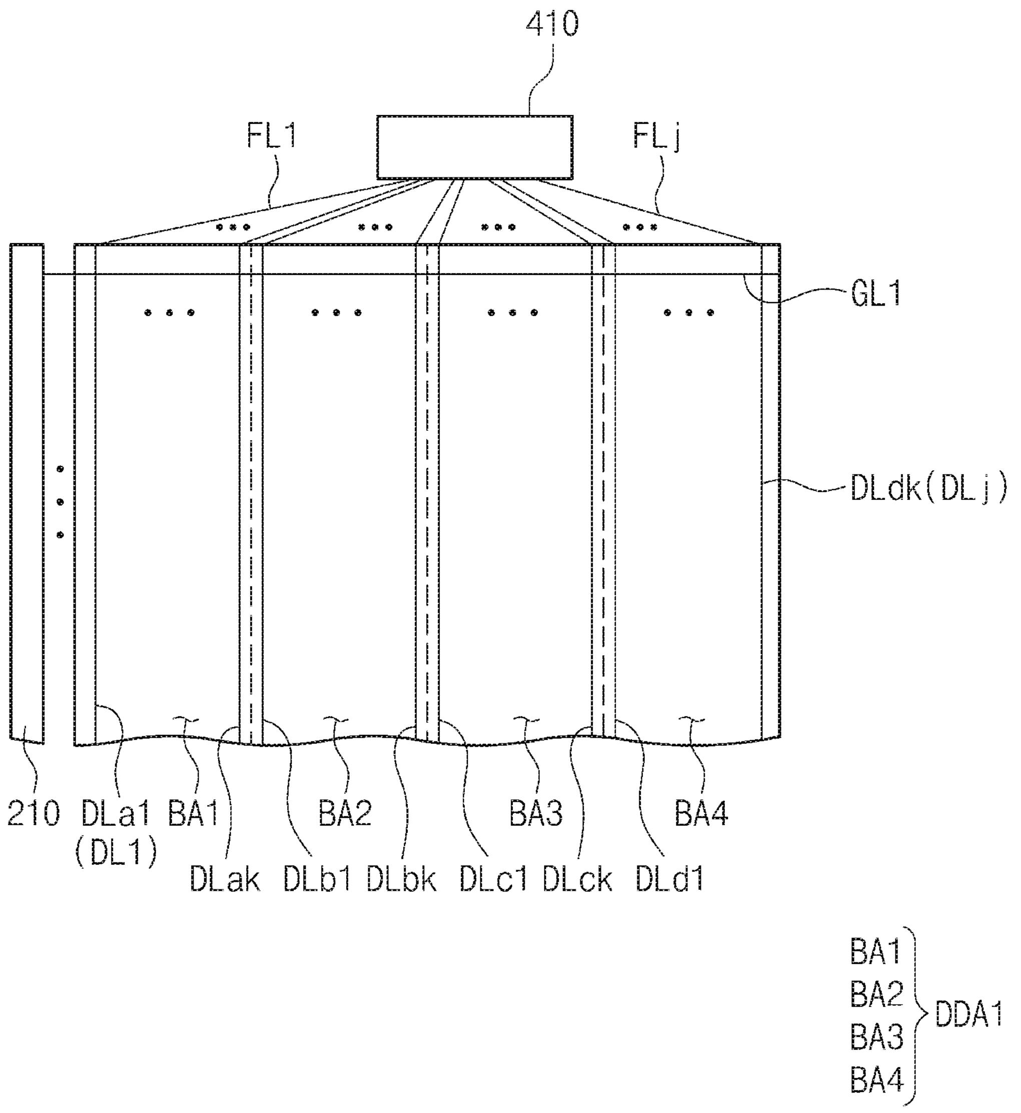
FIG. 3 is an enlarged plan view of a first data integrated circuit and a display panel of A1 in FIG. 2.
Figure 4:
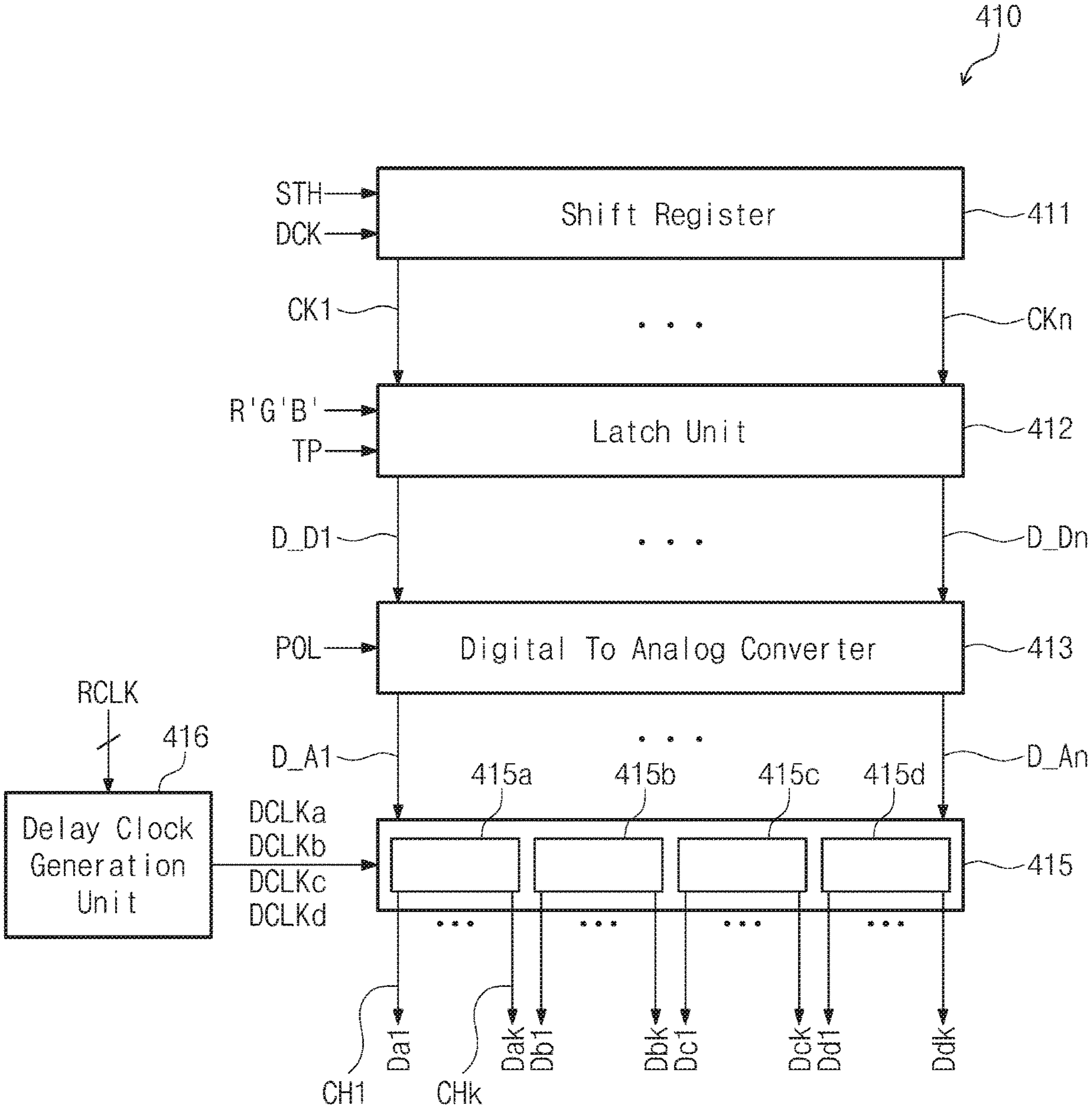
FIG. 4 is an internal block diagram of the first data integrated circuit shown in FIG. 3.

FIG. 3 is an enlarged plan view of a first data integrated circuit and a display panel of A1 in FIG. 2. FIG. 4 is an internal block diagram of the first data integrated circuit shown in FIG. 3.

Referring to FIG. 3, the first driving area DDA1 in which the first group of data lines DL1 to DLj (hereinafter, the first data line group) is disposed may be divided into a plurality of block areas. As an example of the present disclosure, the first driving area DDA1 may include four block areas (hereinafter, first to fourth block areas BA1, BA2, BA3, and BA4). However, the number of block areas included in the first driving area DDA1 is not limited thereto. For example, the first driving area DDA1 may include three or more block areas.

The first data line group DL1 to DLj may be divided into a plurality of blocks that are respectively arranged corresponding to a plurality of block areas. As an example of the present disclosure, the first data line group DL1 to DLj includes data lines of the first block (hereinafter, the first data line block DLa1 to DLak), data lines of the second block (hereinafter, the second data line block DLb1 to DLbk), data lines of the third block (hereinafter, the third data line block DLc1 to DLck), and data lines of the fourth block (hereinafter, the fourth data line block DLd1 to DLdk). The first data line block DLa1 to DLak is disposed in the first block area BA1, and the second data line block DLb1 to DLbk is disposed in the second block area BA2. The third data line block DLc1 to DLck is disposed in the third block area BA3, and the fourth data line block DLd1 to DLdk is disposed in the fourth block area BA4.

The first data line group DL1 to DLj is connected to the first data integrated circuit 410 through the first group of fan-out lines FL1 to FLj (hereinafter referred to as the first fan-out line group). As an example of the present disclosure, the first fan-out line group FL1 to FLj may have different line resistances. Therefore, even if data voltages are simultaneously outputted from the first data integrated circuit 410, while going through the first fan-out line group FL1 to FLj having different line resistance, the time points at which the data voltages reach the first data line group DL1 to DLj may be different from each other.

As described above, when the fan-out lines FL1 to FLj have different line resistances, the first data integrated circuit 410 may adjust the time point at which data voltages are outputted in consideration of the line resistance of each gate line as well as the line resistance of each of the fan-out lines FL1 to FLj.

Referring to FIG. 4, the first data integrated circuit 410 includes a shift register 411, a latch unit 412, a digital to analog converter 413, and an output buffer unit 415.

The shift register 411 sequentially activates a plurality of latch clock signals CK1 to CKn based on a horizontal start signal STH and a data clock signal DCK. The horizontal start signal STH and the data clock signal DCK may be signals included in the data control signal DCS (shown in FIG. 1) provided from the signal controller 100 (shown in FIG. 1).

The latch unit 412 latches the image data signals R'G'B' in response to the latch clock signals CK1 to CKn provided from the shift register 411. According to an embodiment, the latch unit 412 may simultaneously output the latched image data signals R'G'B' to the digital to analog converter 413 based on a data load signal TP, and may provide the latched image data signals R'G'B' to the digital to analog converter 413 at predetermined time differences. The data load signal TP may be a signal included in the data control signal DCS. According to an embodiment, the latched image data signals R'G'B' are defined as digital image signals D_D1 to D_Dn.

The digital to analog converter 413 receives the digital image signals D_D1 to D_Dn from the latch unit 412. The digital to analog converter 413 converts the received digital image signals D_D1 to D_Dn into data voltages D_A1 to D_An of an analog form. Moreover, although not shown in the drawing, the digital to analog converter 413 may be provided with a plurality of gamma voltages from an external source. The digital to analog converter 413 may output the data voltages D_A1 to D_An corresponding to the digital image signals D_D1 to D_Dn based on gamma voltages. By a polarity control signal POL supplied to the digital to analog converter 413, the data voltages may have positive or negative polarity. The polarity control signal POL may be a signal included in the data control signal DCS. Here, the data voltages of the positive polarity may be voltages having a level higher than the reference voltage, and the data voltages of the negative polarity may be voltages having a level lower than the reference voltage.

The data voltages D_A1 to D_An generated from the digital to analog converter 413 are provided to the output buffer unit 415. The output buffer unit 415 may be divided into a plurality of output blocks including one or more output buffers. As an example of the present disclosure, the output buffer unit 415 may include four output blocks (hereinafter referred to as first to fourth output blocks 415*a*, 415*b*, 415*c*, and 415*d*). However, the number of output blocks included in the output buffer unit 415 is not limited thereto. For example, the output buffer unit 415 may include less than or more than four output blocks.

The first data integrated circuit 410 may further include a delay clock generation unit 416. The delayed clock generation unit 416 may generate a plurality of delayed clocks DCLKa, DCLKb, DCLKc, and DCLKd by reflecting the delay information of each of the plurality of output blocks 415*a*, 415*b*, 415*c*, and 415*d* in a preset reference clock RCLK. Here, the plurality of delay clocks DCLKa, DCLKb, DCLKc, and DCLKd includes delay clocks DCLKa of the first block supplied to the first output block 415*a* (hereinafter referred to as a first delay clock block), delay clocks DCLKb of the second block supplied to the second output block 415*b* (hereinafter referred to as the second delay clock block), delay clocks DCLKc of the third block supplied to the third output block 415*c* (hereinafter referred to as a third delay clock block), and delay clocks DCLKd of the fourth block supplied to the fourth output block 415*d* (hereinafter referred to as a fourth delay clock block).

The delay information of each of the first to fourth output 415*a*, 415*b*, 415*c*, and 415*d* may be stored in the delay clock generation unit 416, or may be provided from an external circuit such as the signal controller 100.

The output buffer unit 415 receives first to fourth delay clock blocks DCLKa, DCLKb, DCLKc, and DCLKd from the delay clock generation unit 416. Specifically, the first output block 415*a* outputs data voltages Da1 to Dak of the first block to the first data line block DLa1 to DLak (see FIG. 3) in synchronization with the first delay clock block DCLKa. The second output block 415*b* outputs data voltages Db1 to Dbk of the second block to the second data line block DLb1 to DLbk (see FIG. 3) in synchronization with the second delay clock block DCLKb. The third output block 415*c* outputs data voltages Dc1 to Dck of the third block to the third data line block DLc1 to DLck (see FIG. 3) in synchronization with the third delay clock block DCLKc. The fourth output block 415*d* outputs data voltages Dd1 to Ddk of the fourth block to the fourth data line block DLd1 to DLdk (see FIG. 3) in synchronization with the fourth delay clock block DCLKd.

Each of the first to fourth output blocks 415*a* to 415*d* includes a first to k-th channel CH1 to CHk, and outputs corresponding data voltages through the first to k-th channels CH1 to CHk. That is, each output block 415*a* to 415*d* may respectively determine a time point at which the data voltage is outputted from the first to k-th channels CH1 to CHk in response to a corresponding delay clock block.

Figure 5:
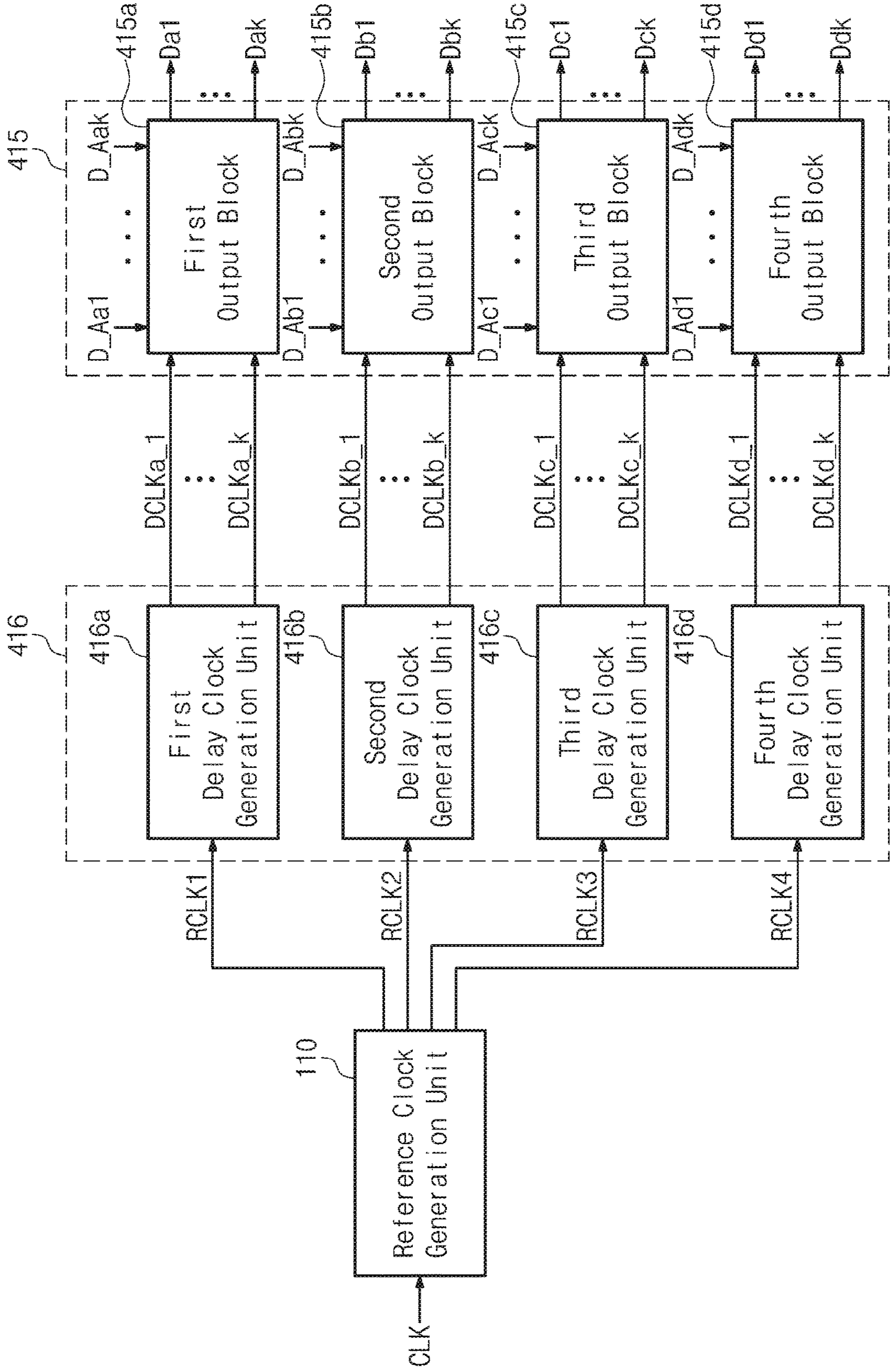
FIG. 5 is a block diagram specifically showing a delay clock generation unit and an output buffer unit shown in FIG. 4.
Figure 6A:
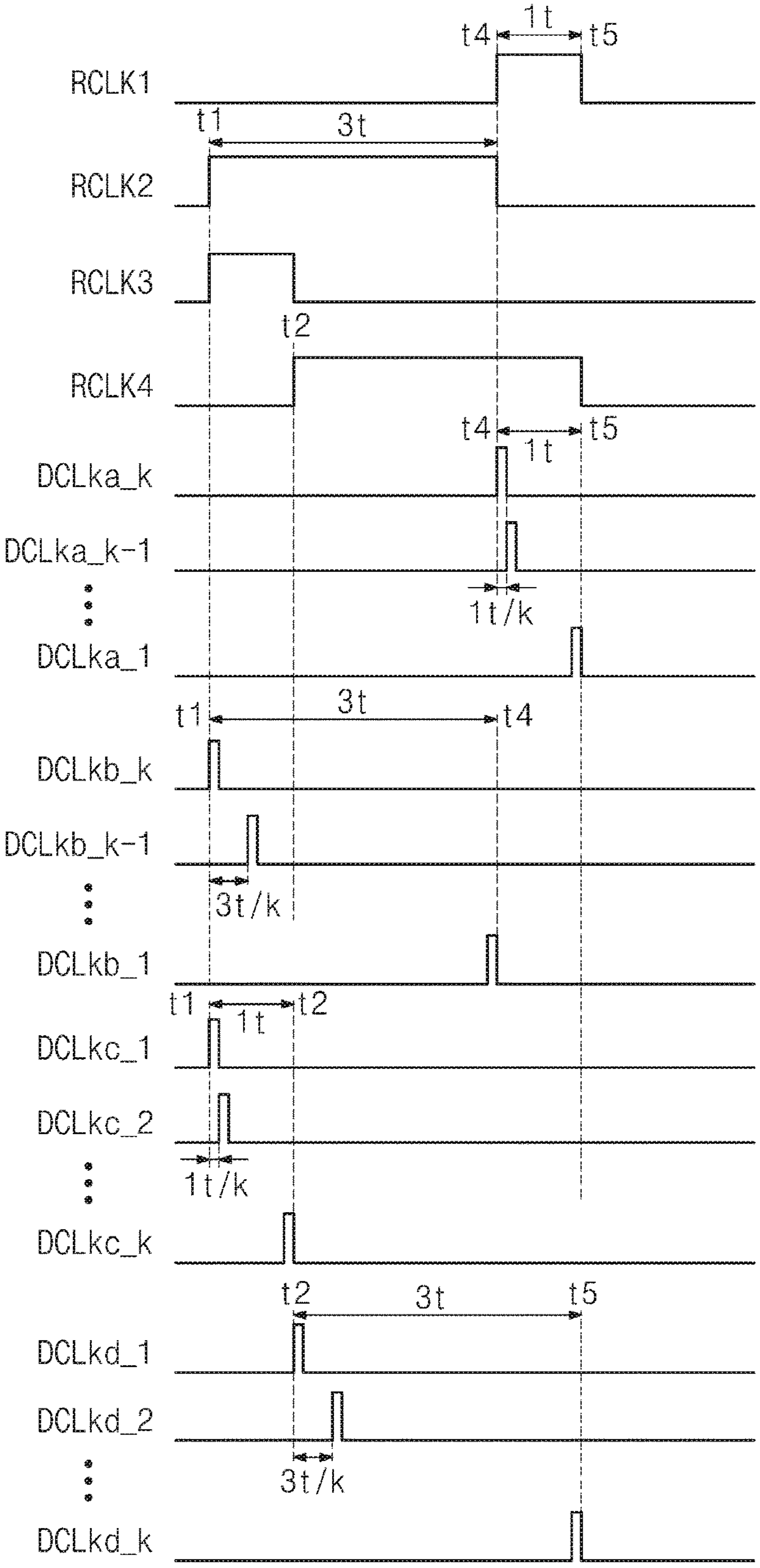
FIG. 6A is a waveform diagram showing first, second, third, and fourth reference clocks and first, second, third, and fourth delayed clock blocks shown in FIG. 5.
Figure 6B:
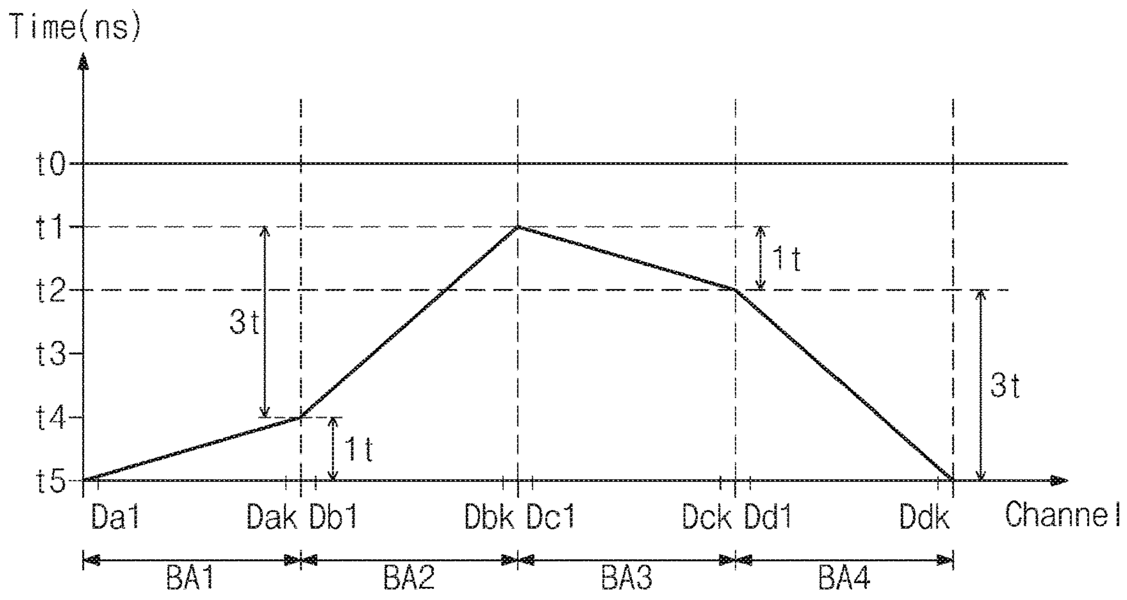
FIG. 6B is a waveform diagram showing output time points of data voltages of first, second, third, and fourth block areas shown in FIG. 5.

FIG. 5 is a block diagram specifically showing a delay clock generation unit and an output buffer unit shown in FIG. 4. FIG. 6A is a waveform diagram showing the first to fourth reference clocks and the first to fourth delay clock blocks shown in FIG. 5, and FIG. 6B is a waveform diagram showing output time points of data voltages of the first to fourth block areas shown in FIG. 5.

Referring to FIG. 5, the signal controller 100 (shown in FIG. 1) may include a reference clock generation unit 110. The reference clock generation unit 110 reflects delay information of each output block in the data clock signal CLK to generate reference clocks RCLK1, RCLK2, RCLK3, and RCLK4 for controlling the delay value of the data voltage outputted from each output block. The reference clock RCLK illustrated in FIG. 4 may include the reference clocks RCLK1, RCLK2, RCLK3, and RCLK4 described above.

When the first data integrated circuit 410 (shown in FIG. 4) includes first to fourth output blocks 415*a*, 415*b*, 415*c*, and 415*d*, the reference clock generation unit 110 may generate first to fourth reference clocks RCLK1, RCLK2, RCLK3, and RCLK4 and supply them to the first data integrated circuit 410. The first data integrated circuit 410 may independently control the delay values of the first to fourth output blocks 415*a*, 415*b*, 415*c*, and 415*d* based on the first to fourth reference clocks RCLK1, RCLK2, RCLK3, and RCLK4.

In FIG. 5, the structure in which the reference clock generation unit 110 is included in the signal controller 100 is illustrated, but the present disclosure is not limited thereto. For example, the reference clock generation unit 110 may be provided in each of the data integrated circuits 410 and 420 (shown in FIG. 2) provided in the display device 1000.

When the output buffer unit 415 of the first data integrated circuit 410 (shown in FIG. 4) includes first to fourth output blocks 415*a*, 415*b*, 415*c*, and 415*d*, the delay clock generation unit 416 may include first to fourth delay clock generation units 416*a*, 416*b*, 416*c*, and 416*d*. The first delay clock generation unit 416*a* receives the first reference clock RCLK1 from the reference clock generation unit 110. The first delay clock generation unit 416*a* may generate first delay clock blocks DCLKa_1 to DCLKa_k by reflecting delay information of each channel of the first output block 415*a* in the first reference clock RCLK1. The first delay clock block DCLKa_1 to DCLKa_k may include first to k-th delay clock signals DCLKa_1 to DCLKa_k in which delay information of first to k-th channels CH1 to CHk of the first output block 415*a* is respectively reflected.

As shown in FIGS. 5, 6A, and 6B, the first reference clock RCLK1 may be activated from a fourth time point t4 delayed by a fourth time from a reference time point t0 to a fifth time point t5. That is, the first reference clock RCLK1 may be activated during a first time period 1t at the fourth time point t4. The k-th delay clock signal DCLKa_k may be activated first among first to k-th delay clock signals DCLKa_1 to DCLKa_k at a rising time point of the first reference clock RCLK1. That is, the first to k-th delay clock signals DCLKa_1 to DCLKa_k may be sequentially activated from the k-th delay clock signal DCLKa_k to the first delay clock signal DCLKa_1. The first to k-th delay clock signals DCLKa_1 to DCLKa_k may have a first phase difference from each other. Specifically, the k-th delay clock signal DCLKa_k and the (k−1)-th delay clock signal DCLKa_k−1 adjacent to each other have a phase difference obtained by dividing the first time period it by the number of channels k. That is, "1t/k" may be defined as a first phase difference.

The first output block 415*a* receives the first group of data voltages D_Aa1 to D_Aak among the data voltages D_A1 to D_An generated from the digital to analog converter 413. The first output block 415*a* reflects the delay information in the first group of data voltages D_Aa1 to D_Aak based on the first to k-th delay clock signals DCLKa_1 to DCLKa_k to output the data voltages of the first block Da1 to Dak.

Referring to FIGS. 5, 6A, and 6B, the second delay clock generation unit 416*b* receives the second reference clock RCLK2 from the reference clock generation unit 110. The second delay clock generation unit 416*b* may generate second delay clock blocks DCLKb_1 to DCLKb_k by reflecting delay information of each channel of the second output block 415*b* in the second reference clock RCLK2. The second delay clock block DCLKb_1 to DCLKb_k may include first to k-th delay clock signals DCLKb_1 to DCLKb_k in which delay information of the first to k-th channels CH1 to CHk of the second output block 415*b* is reflected, respectively.

The second reference clock RCLK2 may be activated from a first time point t1 delayed by a first time from a reference time point t0 to a fourth time point t4. That is, the second reference clock RCLK2 may be activated during a second time period 3t at the first time point t1. The k-th delay clock signal DCLKb_k may be activated first among the first to k-th delay clock signals DCLKb_1 to DCLKb_k at a rising time point of the second reference clock RCLK2. That is, the first to k-th delay clock signals DCLKb_1 to DCLKb_k may be sequentially activated from the k-th delay clock signal DCLKb_k to the first delay clock signal DCLKb_1. The first to k-th delay clock signals DCLKb_1 to DCLKb_k may have a second phase difference from each other. Specifically, the k-th delay clock signal DCLKb_k and the (k−1)-th delay clock signal DCLKb_k−1 adjacent to each other have a phase difference obtained by dividing the second time period 3t by the number of channels k. That is, "3t/k" may be defined as the second phase difference.

The second output block 415*b* receives the second group of data voltages D_Ab1 to D_Abk among the data voltages D_A1 to D_An generated from the digital to analog converter 413. The second output block 415*b* reflects delay information to the second group of data voltages D_Ab1 to D_Abk based on the first to k-th delay clock signals DCLKb_1 to DCLKb_k to output the data voltage Db1 to Dbk of the first block.

Still referring to FIGS. 5, 6A, and 6B, the third delay clock generation unit 416*c* receives the third reference clock RCLK3 from the reference clock generation unit 110. The third delay clock generation unit 416*c* may generate third delay clock blocks DCLKc_1 to DCLKc_k by reflecting delay information of each channel of the third output block 415*c* in the third reference clock RCLK3. The third delay clock block DCLKc_1 to DCLKc_k may include first to k-th delay clock signals DCLKc_1 to DCLKc_k in which delay information of first to k-th channels CH1 to CHk of the third output block 415*c* is respectively reflected.

The third reference clock RCLK3 may be activated from a first time point t1 delayed by a first time from a reference time point t0 to a second time point t2. That is, the third reference clock RCLK3 may be activated during the third time period 1t at the first time point t1. The first delay clock signal DCLKc_1 may be activated first among the first to k-th delay clock signals DCLKc_1 to DCLKc_k at a rising time point of the third reference clock RCLK3. That is, the first to k-th delay clock signals DCLKc_1 to DCLKc_k may be sequentially activated from the first delay clock signal DCLKc_1 to the k-th delay clock signal DCLKc_k. The first to k-th delay clock signals DCLKc_1 to DCLKc_k may have a third phase difference from each other. Specifically, the first delay clock signal DCLKc_1 and the second delay clock signal DCLKc_2 adjacent to each other have a phase difference obtained by dividing the third time period 1t by the number of channels k. That is, "1t/k" may be defined as the third phase difference.

The third output block 415*c* receives a third group of data voltages D_Ac1 to D_Ack among the data voltages D_A1 to D_An generated from the digital to analog converter 413. The third output block 415*c* reflects the delay information in the third group of data voltages D_Ac1 to D_Ack based on the first to k-th delay clock signals DCLKc_1 to DCLKc_k to output the data voltages of the third block Dc1 to Dck.

Still referring to FIGS. 5, 6A, and 6B, the fourth delay clock generation unit 416*d* receives the fourth reference clock RCLK4 from the reference clock generation unit 110. The fourth delay clock generation unit 416*d* may generate a fourth delay clock block DCLKd_1 to DCLKd_k by reflecting delay information of each channel of the fourth output block 415*d* in the fourth reference clock RCLK4. The fourth delay clock block DCLKd_1 to DCLKd_k may include first to k-th delay clock signals DCLKd_1 to DCLKd_k in which delay information of the first to k-th channels CH1 to CHk of the fourth output block 415*d* is respectively reflected.

The fourth reference clock RCLK4 may be activated from the second time point t2 delayed by the second time from the reference time point t0 to the fifth time point t5. That is, the fourth reference clock RCLK4 may be activated during the fourth time period 3t at the second time point t2. The first delay clock signal DCLKd_1 may be activated first among the first to k-th delay clock signals DCLKd_1 to DCLKd_k at a rising time point of the fourth reference clock RCLK4. That is, the first to k-th delay clock signals DCLKd_1 to DCLKd_k may be sequentially activated from the first delay clock signal DCLKd_1 to the k-th delay clock signal DCLKd_k. The first to k-th delay clock signals DCLKd_1 to DCLKd_k may have a fourth phase difference from each other. Specifically, the first delay clock signal DCLKd_1 and the second delay clock signal DCLKd_2 adjacent to each other have a phase difference obtained by dividing the fourth time period 3t by the number of channels k. That is, "3t/k" may be defined as the fourth phase difference.

The fourth output block 415*d* receives the first group of data voltages D_Ad1 to D_Adk among the data voltages D_A1 to D_An generated from the digital to analog converter 413. The fourth output block 415*d* reflects the delay information in the fourth group of data voltages D_Ad1 to D_Adk based on the first to k-th delay clock signals DCLKd_1 to DCLKd_k to output the data voltages of the fourth block Dd1 to Ddk.

As shown in FIGS. 3, 4, 6A, and 6B, data voltages Da1 to Dak of the first block, which are respectively outputted from the first to k-th channels CH1 to CHk of the first output block 415*a*, are supplied to the first data line block DLa1 to DLak disposed in the first block area BA1. Data voltages Db1 to Dbk of the second block, which are outputted from the first to k-th channels CH1 to CHk of the second output block 415*b*, are supplied to the second data line block DLb1 to DLbk disposed in the second block area BA2. Here, the data voltages Da1 to Dak of the first block have a first time difference (1t/k) at a fourth time point t4 and are sequentially delayed from the k-th data voltage Dak to the first data voltage Da1. On the other hand, the data voltages Db1 to Dbk of the second block have a second time difference (3t/k) at the first time point t1 and are sequentially delayed from the k-th data voltage Dbk to the first data voltage Db1.

Also, the data voltages Dc1 to Dck of the third block, which are outputted from the first to k-th channels CH1 to CHk of the third output block 415*c*, are supplied to the third data line block DLc1 to DLck disposed in the third block area BA3. The data voltages Dd1 to Ddk of the fourth block, which are outputted from the first to k-th channels CH1 to CHk of the fourth output block 415*d*, are supplied to the fourth data line block DLd1 to DLdk arranged in the fourth block area BA4. Here, the data voltages Dc1 to Dck of the third block have a third time difference (1t/k) at the first time point t1, and are sequentially delayed from the first data voltage Dc1 to the k-th data voltage Dck. On the other hand, the data voltages Dd1 to Ddk of the fourth block have a fourth time difference (3t/k) at the second time point t2, and are sequentially delayed from the first data voltage Dd1 to the k-th data voltage Ddk.

As such, delay values of data voltages outputted from one data integrated circuit may be different for each block. That is, the delay value of data lines is not determined by one variable, and the surrounding design factors such as the difference in the length of the fan-out lines, the distance from the gate driving circuits, and the number and location of the gate driving circuits are all reflected and determined. Therefore, there may be a case where the delay values of data voltages must be set differently for each block. As described above, by controlling the delay values of the data voltages in units of blocks, fine adjustment of the delay values may be possible. As a result, it is possible to efficiently reduce the variation in the charging rate between pixels.

FIG. 6B illustrates that the output waveforms of the data voltages of the first to fourth blocks have an inverted V-shape as an example of the present disclosure. For example, the level at which the data voltage is delayed is large due to the length difference between the fan-out lines FL1 to FLj (shown in FIG. 3), and when the level at which the gate signal is delayed is relatively small, the delay values of the data voltages outputted from the data integrated circuits 410 and 420 may be set according to a difference in length between the fan-out lines FL1 to FLj. That is, the output waveforms of the data voltages of the first to fourth blocks may be set in an inverted V-shape in which the delay value of the data voltage decreases toward the center of the fan-out lines FL1 to FLj. However, the shape of the output waveform of the data voltages of the first to fourth blocks is not limited to this. That is, the shape of the output waveform of the data voltages of the first to fourth blocks may be varied in various forms depending on the mounting location of the data integrated circuits 410 and 420, the type of fan-out lines FL1 to FLj, or the delay level of the gate signal.

Figure 6C:
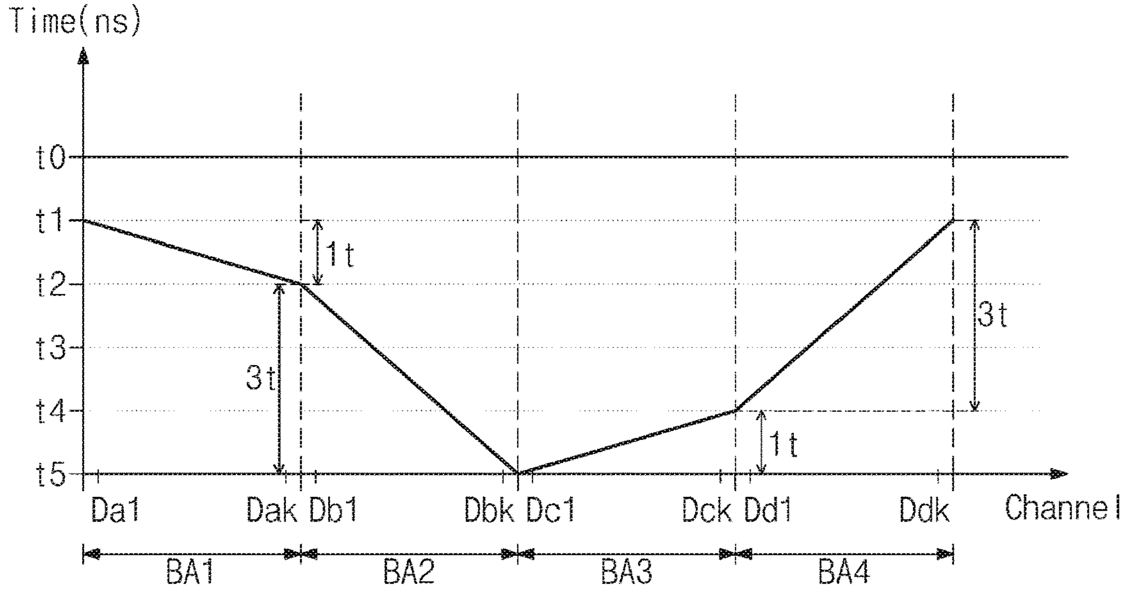
FIG. 6C is a waveform diagram showing output time points of data voltages of first, second, third, and fourth block areas according to another embodiment.

FIG. 6C is a waveform diagram showing output time points of data voltages of the first to fourth blocks according to another embodiment of the present disclosure.

Referring to FIGS. 3, 4, 5, and 6C, the data voltages Da1 to Dak of the first block, which are outputted from the first to k-th channels CH1 to CHk of the first output block 415*a*, are supplied to the first data line block DLa1 to DLak disposed in the first block area BA1. The data voltages Db1 to Dbk of the second block, which are outputted from the first to k-th channels CH1 to CHk of the second output block 415*b*, are supplied to the second data line block DLb1 to DLbk disposed in the second block area BA2. Here, the data voltages Da1 to Dak of the first block have a first time difference (1t/k) at a first time point t1 and are sequentially delayed from the first data voltage Da1 to the k-th data voltage Dak. On the other hand, the data voltages Db1 to Dbk of the second block have a second time difference (3t/k) at the second time point t2 and are sequentially delayed from the first data voltage Db1 to the k-th data voltage Dbk.

Also, the data voltages Dc1 to Dck of the third block, which are outputted from the first to k-th channels CH1 to CHk of the third output block 415*c*, are supplied to the third data line block DLc1 to DLck disposed in the third block area BA3. The data voltages Dd1 to Ddk of the fourth block, which are outputted from the first to k-th channels CH1 to CHk of the fourth output block 415*d*, are supplied to the fourth data line block DLd1 to DLdk arranged in the fourth block area BA4. Here, the data voltages Dc1 to Dck of the third block have a third time difference (1t/k) at the fourth time point t4 and are sequentially delayed from the k-th data voltage Dck to the first data voltage Dc1. On the other hand, the data voltages Dd1 to Ddk of the fourth block have a fourth time difference (3t/k) at the first time point t1 and are sequentially delayed from the k-th data voltage Ddk to the first data voltage Dd1.

FIG. 6C illustrates that the output waveforms of the data voltages of the first to fourth blocks have a V-shape as an example of the present disclosure. For example, when the fan-out lines FL1 to FLj (shown in FIG. 3) have the same length, the delay level of the data voltage due to the length difference between the fan-out lines may be negligibly small. At this time, if the first and second gate driving circuits are respectively disposed at both ends of the gate line, the output waveforms of the data voltages of the first to fourth blocks of the data integrated circuit of any one of the data integrated circuits may be set in a V-shape in which the delay value of the data voltage increases as it goes toward the center of the fan-out lines FL1 to FLj.

Figure 7:
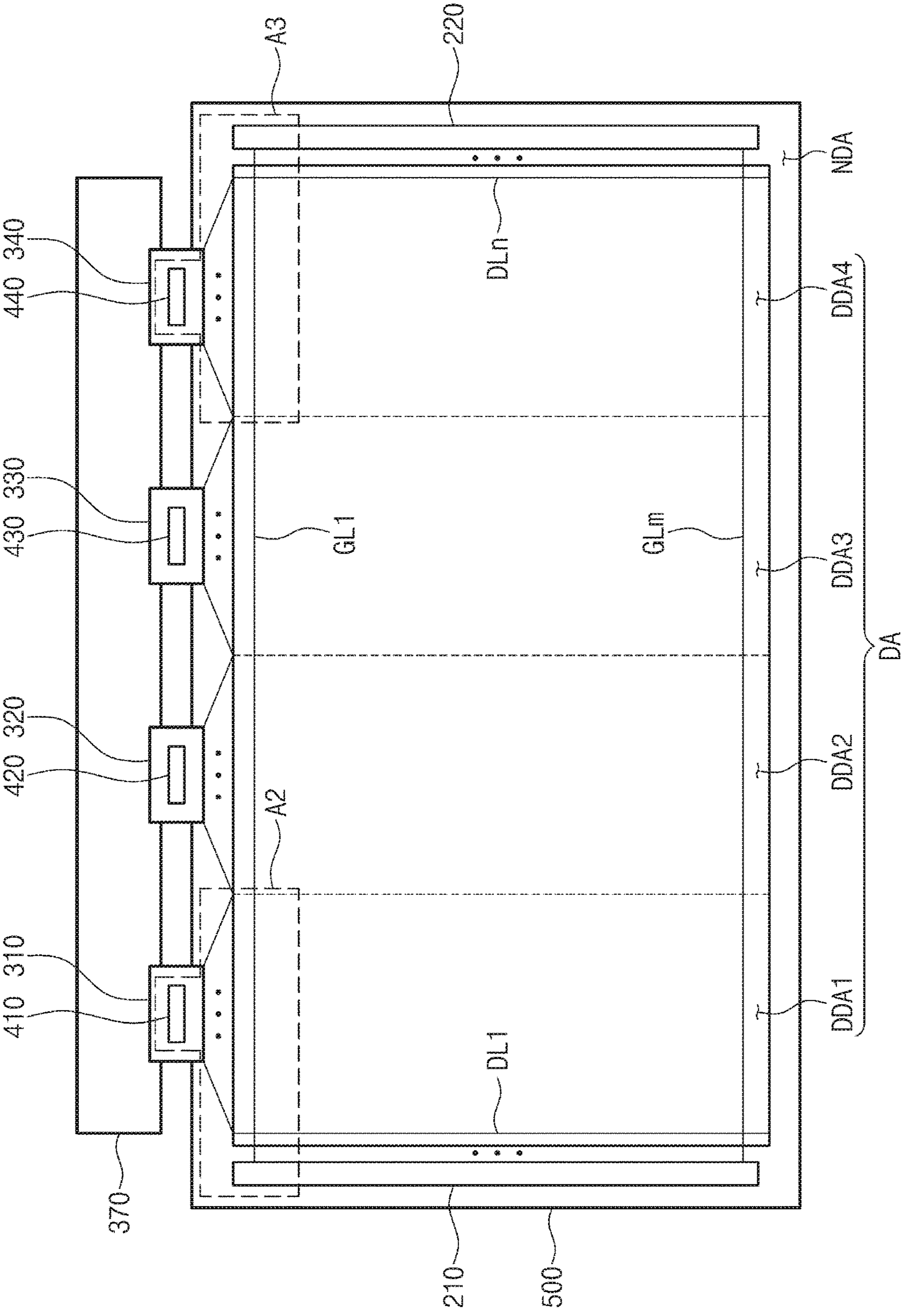
FIG. 7 is a plan view of a display device according to an embodiment of the present disclosure.
Figure 8:
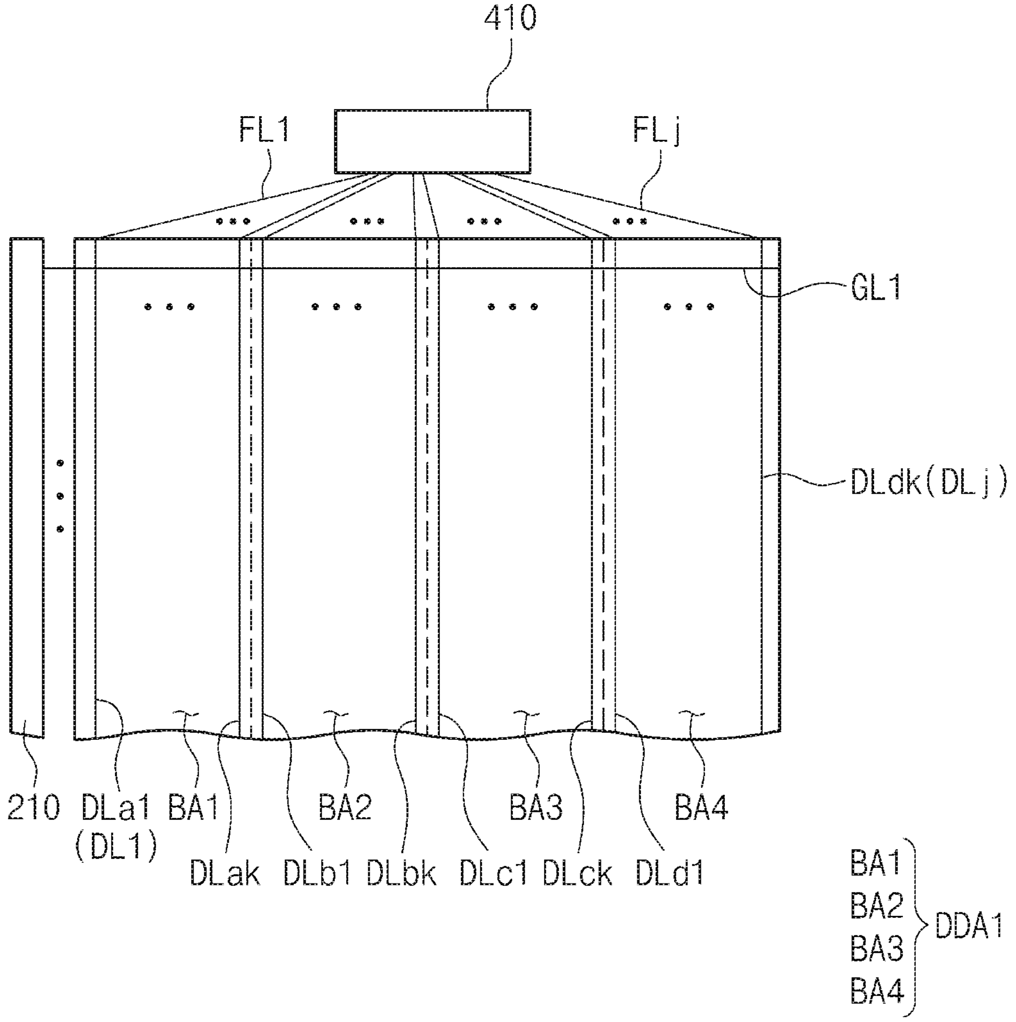
FIG. 8 is an enlarged plan view of a first data integrated circuit and a display panel part of A2 in FIG. 7.
Figure 9:
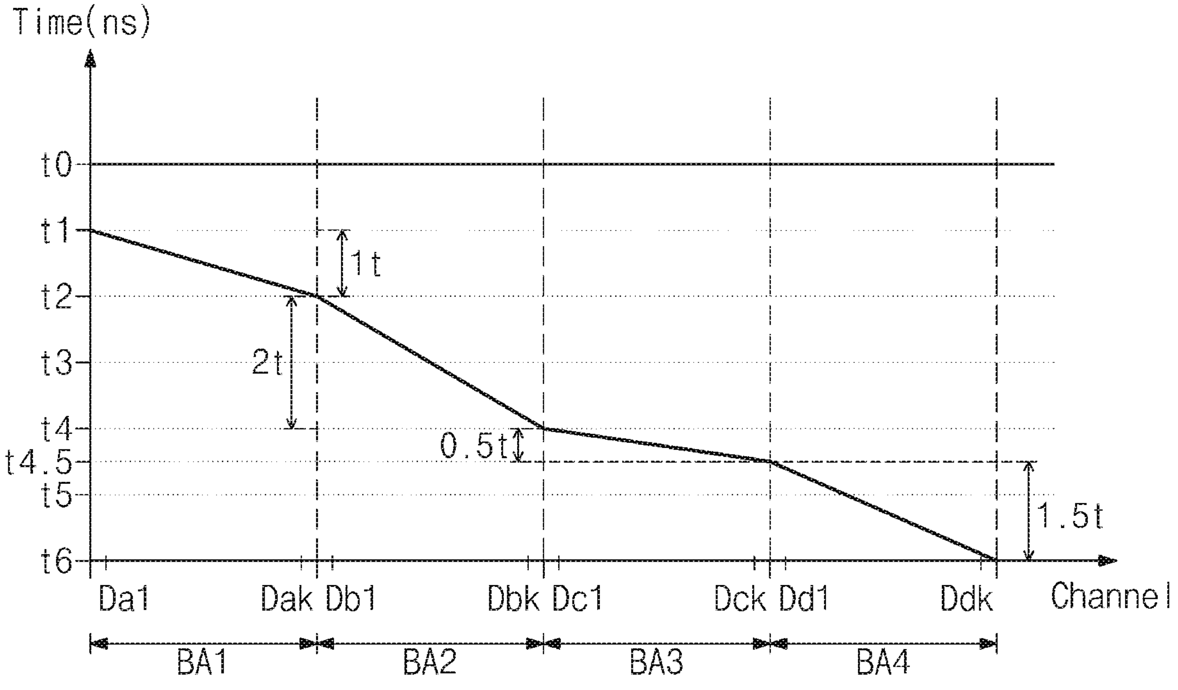
FIG. 9 is a waveform diagram showing output time points of data voltages of first, second, third, and fourth block areas applied to data lines of first, second, third, and fourth blocks shown in FIG. 8.
Figure 10:
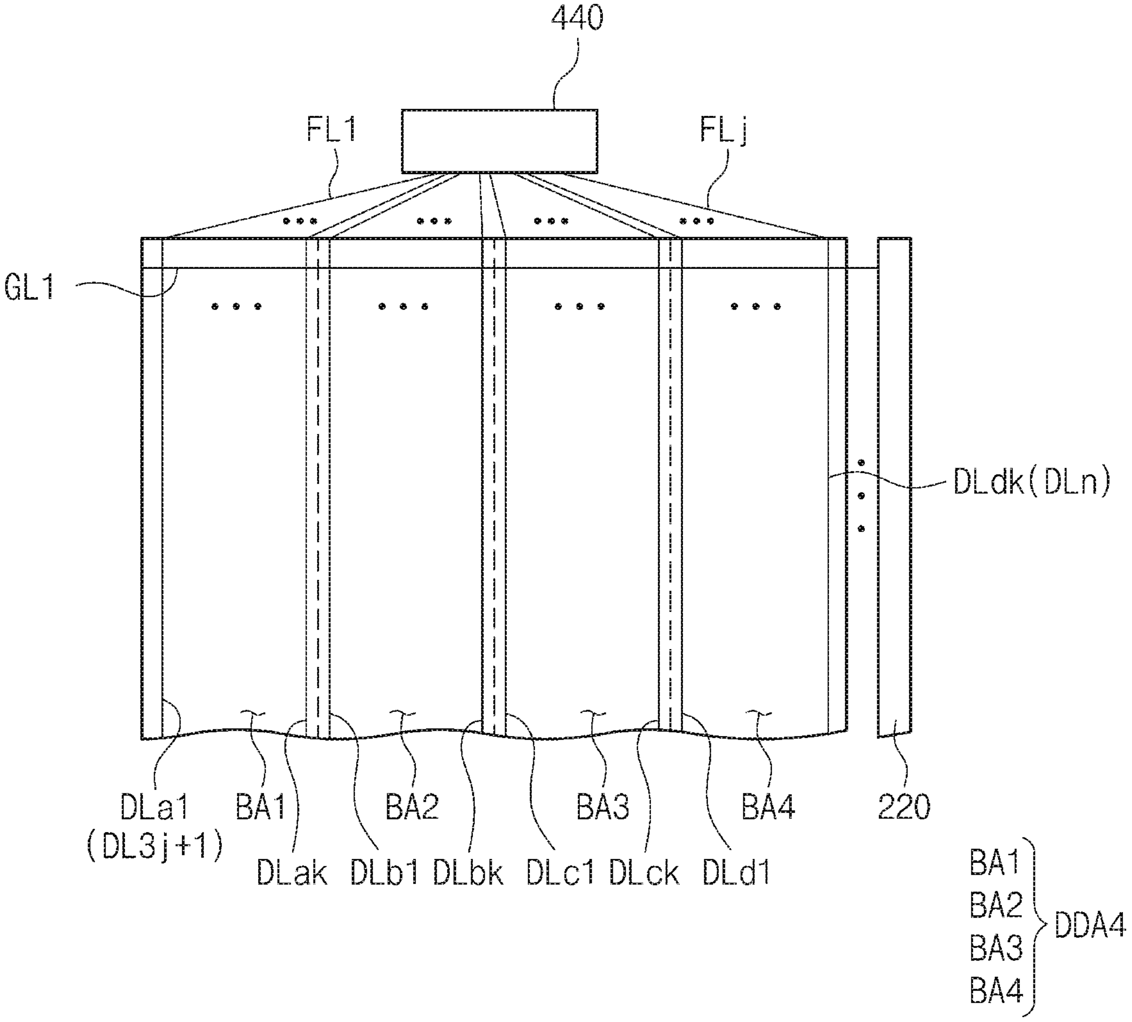
FIG. 10 is an enlarged plan view of a fourth data integrated circuit and a display panel of A3 in FIG. 7.
Figure 11:
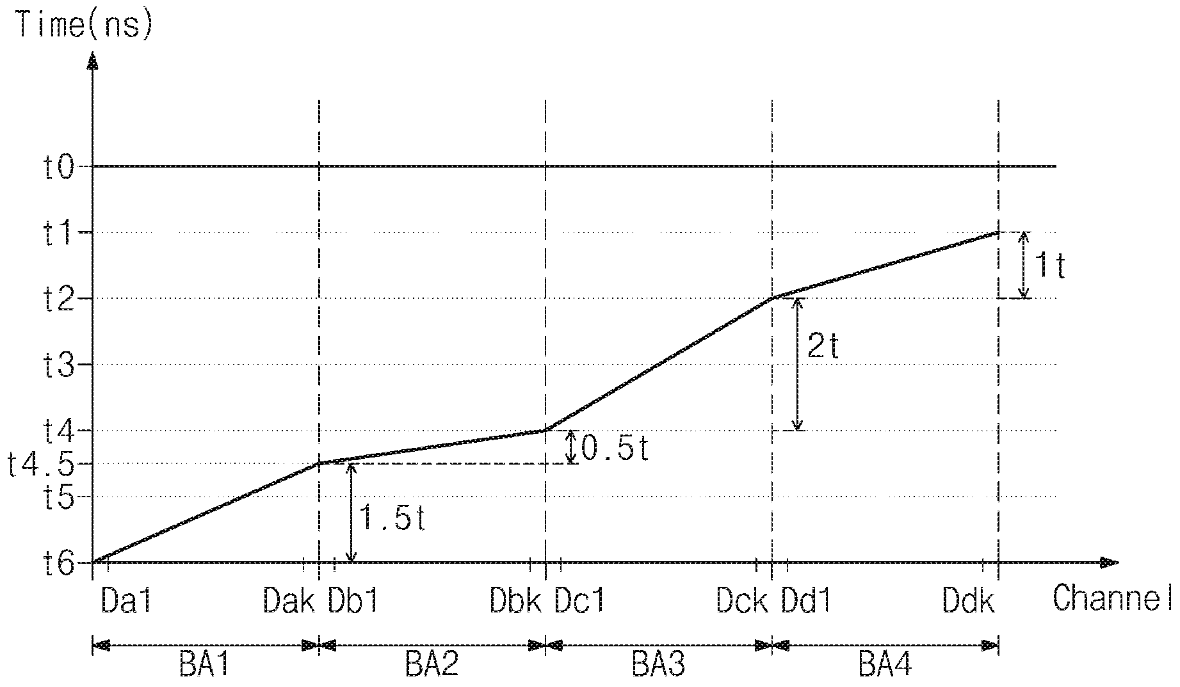
FIG. 11 is a waveform diagram showing output time points of data voltages of first, second, third, and fourth block areas applied to data lines of first, second, third, and fourth block areas shown in FIG. 10.

FIG. 7 is a plan view of a display device according to an embodiment of the present disclosure. FIG. 8 is an enlarged plan view of a first data integrated circuit and a display panel shown in part A2 of FIG. 7, and FIG. 9 is a waveform diagram showing output time points of data voltages of the first to fourth blocks applied to data lines of the first to fourth blocks shown in FIG. 8. FIG. 10 is an enlarged plan view of a fourth data integrated circuit and a display panel shown in part A3 of FIG. 7, and FIG. 11 is a waveform diagram showing output time points of data voltages of the first to fourth blocks applied to data lines of the first to fourth blocks shown in FIG. 10.

Referring to FIG. 7, the data driver 400 (refer to FIG. 1) may include first to fourth data integrated circuits 410, 420, 430, and 440. In FIG. 7, it is shown that the data driver 400 has a structure including four data integrated circuits 410 to 440, but the present disclosure is not limited thereto.

According to an embodiment, the display device 1000 may further include flexible circuit boards 310 to 340 in which the data integrated circuits 410 to 440 are mounted in a TCP (Tape Carrier Package) manner, and a printed circuit board 370 electrically connected to the flexible circuit boards 310 to 340. Specifically, the display device 1000 may include a first flexible circuit board 310 on which the first data integrated circuit 410 is mounted, a second flexible circuit board 320 on which the second data integrated circuit 420 is mounted, a third flexible circuit board 330 on which the third data integrated circuit 430 is mounted, and a fourth flexible circuit board 340 on which the fourth data integrated circuit 440 is mounted.

The first to fourth flexible circuit boards 310 to 340 electrically connect the display panel 500 and the printed circuit board 370 and are disposed therebetween.

The first data integrated circuit 410 may be connected to the first group of data lines among the data lines DL1 to DLn, and the second data integrated circuit 420 may be connected to the second group of data lines among the data lines DL1 to DLn. The first data integrated circuit 430 may be connected to the first group of data lines among the data lines DL1 to DLn, and the second data integrated circuit 440 may be connected to the second group of data lines among the data lines DL1 to DLn.

Here, the display area DA may include first to fourth driving areas DDA1 to DDA4 respectively driven by the first to fourth data integrated circuits 410 to 440. The first group of data lines is disposed in the first driving area DDA1, and the second group of data lines is disposed in the second driving area DDA2. In addition, a third group of data lines is disposed in the third driving area DDA3 and a fourth group of data lines is disposed in the fourth driving area DDA4.

Referring to FIGS. 8 and 9, the first driving area DDA1 in which the first group of data lines DL1 to DLj (hereinafter, the first data line group) is disposed may be divided into a plurality of block areas. As an example of the present disclosure, the first driving area DDA1 may include four block areas (hereinafter, first to fourth block areas BA1, BA2, BA3, and BA4).

The first data line group DL1 to DLj may be divided into a plurality of blocks that are respectively arranged corresponding to a plurality of block areas. As an example of the present disclosure, the first data line group DL1 to DLj includes a first data line block DLa1 to DLak, a second data line block DLb1 to DLbk, a third data line block DLc1 to DLck, and a fourth data line block DLd1 to DLdk. The first data line block DLa1 to DLak is disposed in the first block area BA1, and the second data line block DLb1 to DLbk is disposed in the second block area BA2. The third data line block DLc1 to DLck is disposed in the third block area BA3, and the fourth data line block DLd1 to DLdk is disposed in the fourth block area BA4.

The first data line group DL1 to DLj is connected to the first data integrated circuit 410 through the first fan-out line group FL1 to FLj. As an example of the present disclosure, fan-out lines of the first fan-out line group FL1 to FLj may have different line resistances. Therefore, even if data voltages are simultaneously output from the first data integrated circuit 410, while going through fan-out lines FL1 to FLj with different line resistance, the time points at which the data voltages reach the first data line group DL1 to DLj may be different from each other.

As described above, when the fan-out lines FL1 to FLj have different line resistances, a time point at which data voltages are outputted may be adjusted in consideration of the line resistance of each of the fan-out lines FL1 to FLj.

In addition, the gate signal outputted from the first gate driving circuit 210 may be delayed toward the center from the first end of each gate line GL1 to GLm (shown in FIG. 7). Specifically, a difference occurs between a time point at which a gate signal reaches the pixels connected to the first data line DL1 among the first data line group DL1 to DLj and a time point (hereinafter, turn-on time point) at which the gate signal reaches the pixels connected to the last data line DLj.

For example, a time point at which a pixel (hereinafter, a first pixel) connected to the first gate line GL1 and the first data line DL1 is turned on in response to the first gate signal may be different from a time point at which a pixel (hereinafter, a j-th pixel) connected to the first gate line GL1 and the j-th data line DLj is turned on in response to the first gate signal. That is, the turn-on time point of the j-th pixel may be delayed by a predetermined time than the turn-on time point of the first pixel. The delay time of the gate signal may vary depending on the line resistance of each gate line.

As described above, according to the line resistance of each gate line, a variation in turn-on time between pixels may occur depending on the position. In addition, when a variation in turn-on time occurs between pixels included in the same pixel row, a problem that a charging rate of a pixel that is turned on relatively slowly is lowered may occur.

In order to improve the charging rate reduction problem, the first data integrated circuit 410 may adjust a time point at which data voltages are outputted in consideration of the line resistance of each gate line.

Data voltages Da1 to Dak of the first block are supplied to the first data line block DLa1 to DLak disposed in the first block area BA1. Data voltages Db1 to Dbk of the second block are supplied to the second data line block DLb1 to DLbk disposed in the second block area BA2. Here, the data voltages Da1 to Dak of the first block have a first time difference (1t/k) at a first time point t1 and are sequentially delayed from the first data voltage Da1 to the k-th data voltage Dak. On the other hand, the data voltages Db1 to Dbk of the second block have a second time difference (2t/k) at the second time point t2 and are sequentially delayed from the first data voltage Db1 to the k-th data voltage Dbk.

Also, data voltages Dc1 to Dck of the third block are supplied to the third data line block DLc1 to DLck disposed in the third block area BA3. Data voltages Dd1 to Ddk of the fourth block are supplied to the fourth data line block DLd1 to DLdk arranged in the fourth block area BA4. Here, the data voltages Dc1 to Dck of the third block have a third time difference (0.5t/k) at the fourth time point t4 and are sequentially delayed from the first data voltage Dc1 to the k-th data voltage Dck. On the other hand, the data voltages Dd1 to Ddk of the fourth block have a fourth time difference (1.5t/k) at the 4.5th time point t4.5 and are sequentially delayed from the first data voltage Dd1 to the k-th data voltage Ddk.

Referring to FIGS. 10 and 11, a fourth driving area DDA4 in which a fourth group of data lines DL3*j*+1 to DLn (hereinafter, a fourth data line group) is disposed may be divided into a plurality of block areas. As an example of the present disclosure, the fourth driving area DDA4 may include four block areas (hereinafter, first to fourth block areas BA1, BA2, BA3, and BA4). FIG. 10 shows that the fourth driving area DDA4 includes the same number of block areas as the first driving area DDA1, but the present disclosure is not limited thereto. That is, the fourth driving area DDA4 may include the number of block areas different from the number of block areas included in the first driving area DDA1. For example, it is also possible that the fourth driving area DDA4 includes three block areas.

The fourth data line group DL3*j*+1 to DLn may be divided into a plurality of blocks that are respectively arranged corresponding to a plurality of block areas. As an example of the present disclosure, the fourth data line group DL3*j*+1 to DLn includes a first data line block DLa1 to DLak, a second data line block DLb1 to DLbk, a third data line block DLc1 to DLck, and a fourth data line block DLd1 to DLdk. The first data line block DLa1 to DLak is disposed in the first block area BA1, and the second data line block DLb1 to DLbk is disposed in the second block area BA2. The third data line block DLc1 to DLck is disposed in the third block area BA3, and the fourth data line block DLd1 to DLdk is disposed in the fourth block area BA4.

In addition, the gate signal outputted from the second gate driving circuit 220 may be delayed toward the center from the first end of each gate line GL1 to GLm (shown in FIG. 7). Specifically, a difference occurs between a time point at which a gate signal reaches the pixels connected to the first data line DL3*j*+1 among the fourth data line group DL3*j*+1 to DLn and a time point (hereinafter, turn-on time point) at which the gate signal reaches the pixels connected to the last data line DLn.

For example, a time point at which a pixel (hereinafter, the (3*j*+1)-th pixel) connected to the first gate line GL1 and the (3*j*+1)-th data line DL3*j*+1 is turned on in response to the first gate signal may be different from a time point at which a pixel (hereinafter, an n-th pixel) connected to the first gate line GL1 and the n-th data line DLn is turned on in response to the first gate signal. That is, the turn-on time point of the (3*j*+1)-th pixel may be delayed by a predetermined time from the turn-on time point of the n-th pixel. The delay time of the gate signal may vary depending on the line resistance of each gate line.

As described above, according to the line resistance of each gate line, a variation in turn-on time between pixels may occur depending on the position. In addition, when a variation in turn-on time occurs between pixels included in the same pixel row, a problem that a charging rate of a pixel that is turned on relatively slowly is lowered may occur.

In order to improve the charging rate reduction problem, the fourth data integrated circuit 440 may adjust a time point at which data voltages are outputted in consideration of the line resistance of each gate line.

As shown in FIG. 11, data voltages Da1 to Dak of the first block are supplied to the first data line block DLa1 to DLak disposed in the first block area BA1. Data voltages Db1 to Dbk of the second block are supplied to the second data line block DLb1 to DLbk disposed in the second block area BA2. Here, the data voltages Da1 to Dak of the first block have a first time difference (1.5t/k) at a 4.5th time point t4.5 and are sequentially delayed from the k-th data voltage Dak to the first data voltage Da1. On the other hand, the data voltages Db1 to Dbk of the second block have a second time difference (0.5t/k) at the fourth time point t4 and are sequentially delayed from the k-th data voltage Dbk to the first data voltage Db1.

Also, data voltages Dc1 to Dck of the third block are supplied to the third data line block DLc1 to DLck disposed in the third block area BA3. Data voltages Dd1 to Ddk of the fourth block are supplied to the fourth data line block DLd1 to DLdk arranged in the fourth block area BA4. Here, the data voltages Dc1 to Dck of the third block have a third time difference (2t/k) at the second time point t2 and are sequentially delayed from the k-th data voltage Dck to the first data voltage Dc1. On the other hand, the data voltages Dd1 to Ddk of the fourth block have a fourth time difference (1t/k) at the first time point t1 and are sequentially delayed from the k-th data voltage Ddk to the first data voltage Dd1.

As described above, since the first and fourth data integrated circuits 410 and 440 are provided at different locations, it is possible to control the output time points of the data voltages with different delay patterns. In addition, since each of the first and fourth data integrated circuits 410 and 440 includes a plurality of output blocks, a delay value of data voltages can be adjusted in units of blocks.

Figure 12:
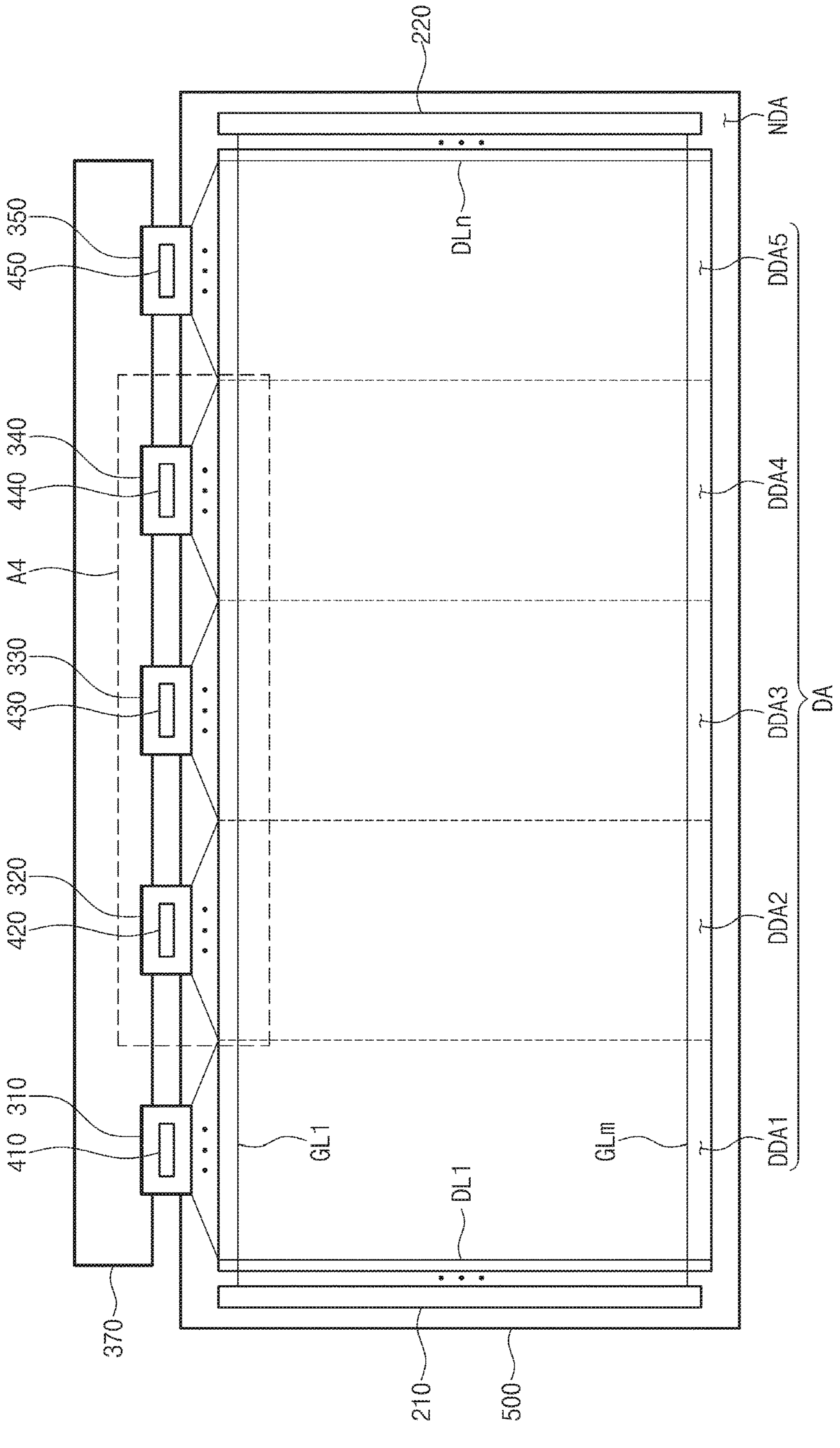
FIG. 12 is a plan view of a display device according to an embodiment of the present disclosure.
Figure 13:
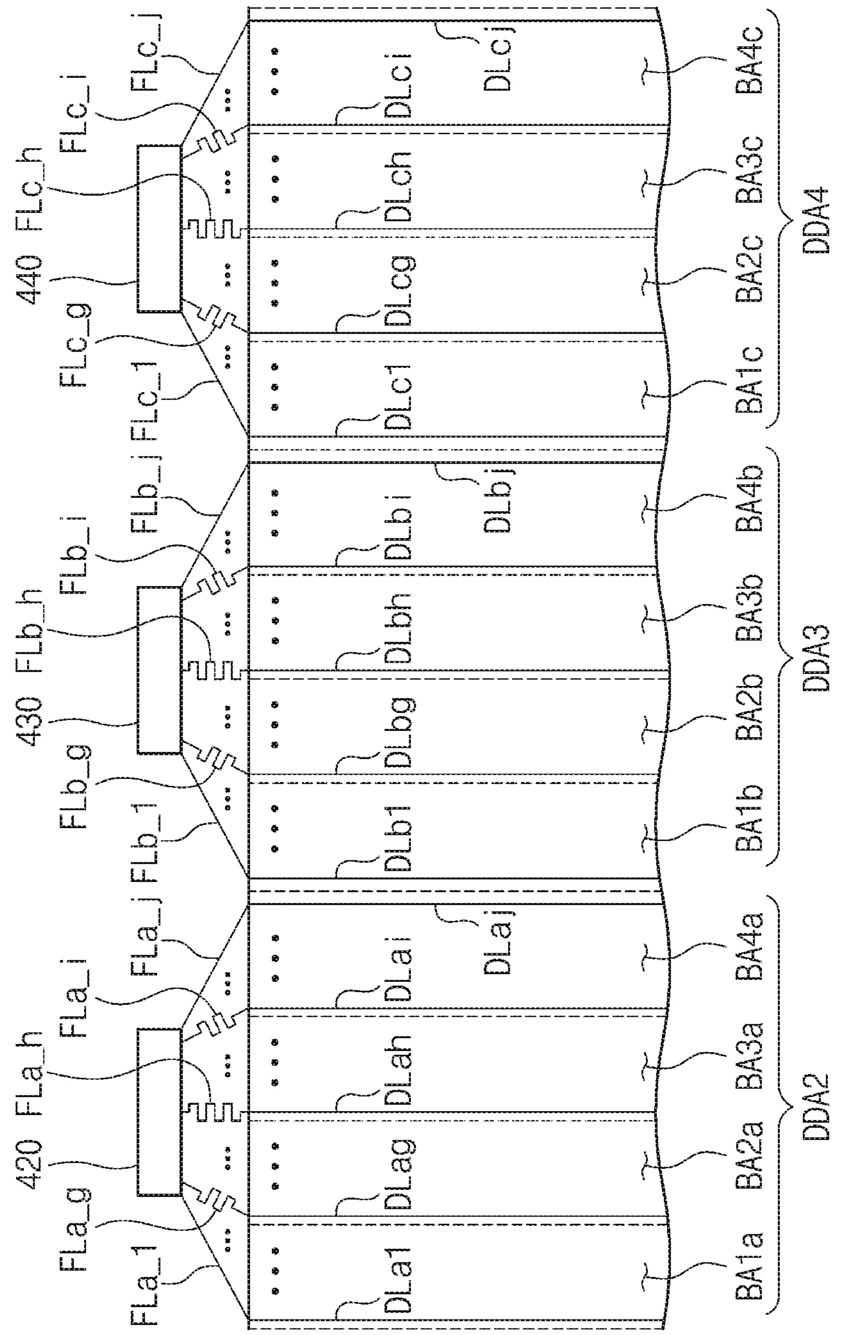
FIG. 13 is an enlarged plan view of second, third, and fourth data integrated circuits and a display panel of A4 in FIG. 12.
Figure 14:
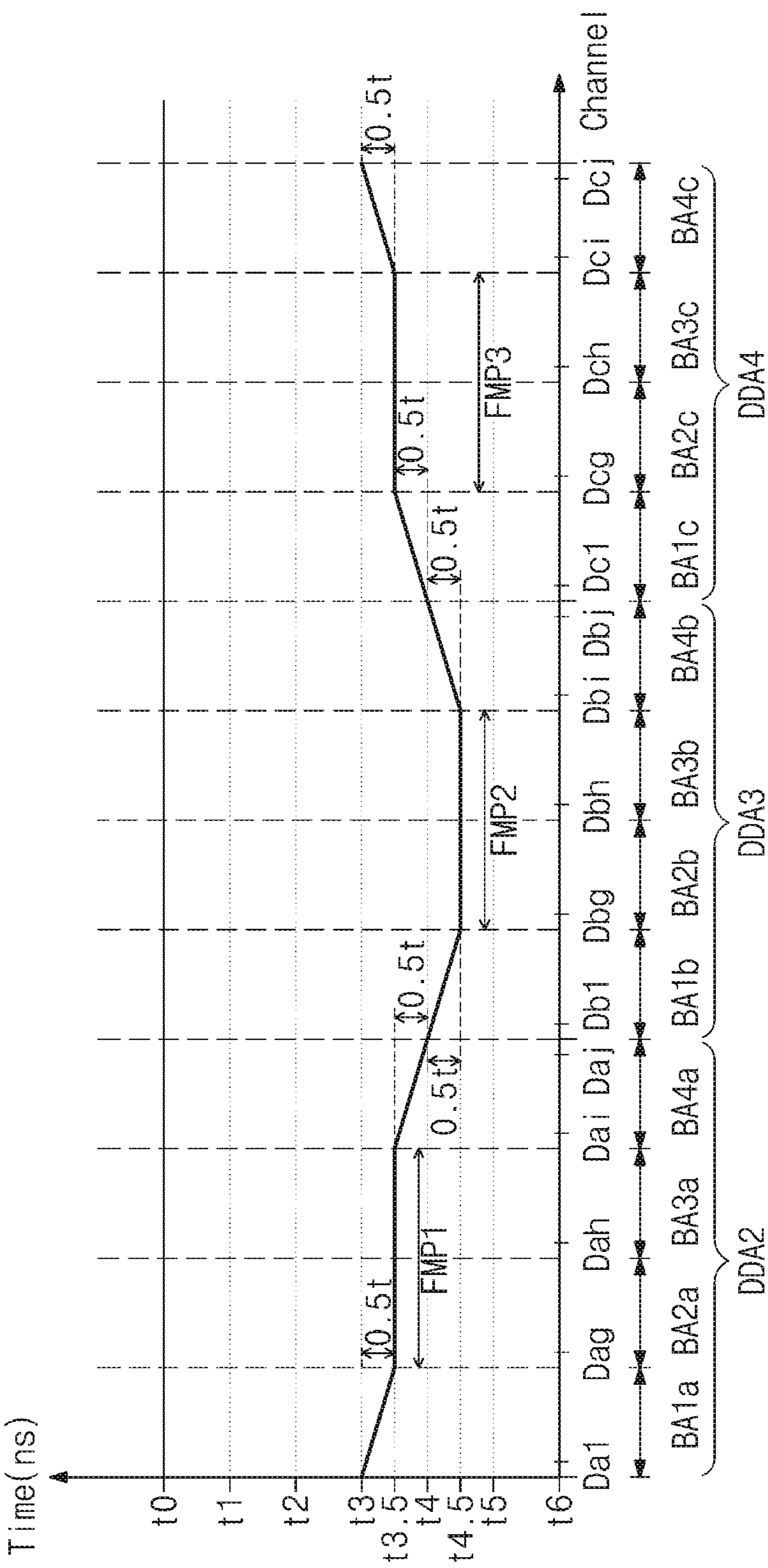
FIG. 14 is a waveform diagram showing output time points of data voltages applied to data lines disposed in first, second, and third driving areas illustrated in FIG. 13.

FIG. 12 is a plan view of a display device according to an example embodiment of the present disclosure. FIG. 13 is an enlarged plan view of second to fourth data integrated circuits and a display panel illustrated in part A4 of FIG. 12. FIG. 14 is a waveform diagram illustrating output time points of data voltages applied to data lines disposed in the second to fourth driving areas shown in FIG. 13.

Referring to FIG. 12, the data driver 400 (refer to FIG. 1) may include first to fifth data integrated circuits 410, 420, 430, 440, and 450. In FIG. 12, it is shown that the data driver 400 has a structure including five data integrated circuits 410 to 450, but the present disclosure is not limited thereto.

According to an embodiment, the display device 1000 may further include flexible circuit boards 310 to 350 in which the data integrated circuits 410 to 450 are mounted in a TCP manner, and a printed circuit board 370 electrically connected to the flexible circuit boards 310 to 350. Specifically, the display device 1000 may include a first flexible circuit board 310 on which the first data integrated circuit 410 is mounted, a second flexible circuit board 320 on which the second data integrated circuit 420 is mounted, a third flexible circuit board 330 on which the third data integrated circuit 430 is mounted, a fourth flexible circuit board 340 on which the fourth data integrated circuit 440 is mounted, and a fifth flexible circuit board 350 on which the fifth data integrated circuit 450 is mounted.

The first to fifth flexible circuit boards 310 to 350 electrically connect the display panel 500 and the printed circuit board 370 and are disposed therebetween.

The first data integrated circuit 410 may be connected to the first group of data lines among the data lines DL1 to DLn, and the second data integrated circuit 420 may be connected to the second group of data lines among the data lines DL1 to DLn. The first data integrated circuit 430 may be connected to the first group of data lines among the data lines DL1 to DLn, and the second data integrated circuit 440 may be connected to the second group of data lines among the data lines DL1 to DLn, and the fifth data integrated circuit 450 may be connected to the fifth group of data lines among the data lines DL1 to DLn.

Here, the display area DA may include first to fifth driving areas DDA1 to DDA5 respectively driven by the first to fifth data integrated circuits 410 to 450. The first group of data lines is disposed in the first driving area DDA1, and the second group of data lines is disposed in the second driving area DDA2. In addition, a third group of data lines is disposed in the third driving area DDA3 and a fourth group of data lines is disposed in the fourth driving area DDA4. The fifth group of data lines is disposed in the fifth driving area DDA5.

Referring to FIGS. 12 and 13, the second data integrated circuit 420 is connected to the second group of data lines DLa1, DLag, DLah, DLai, and DLaj disposed in the second driving area DDA2. The third data integrated circuit 430 is connected to the third group of data lines DLb1, DLbg, DLbh, DLbi, DLbj arranged in the third driving area DDA3. The fourth data integrated circuit 440 is connected to the fourth group of data lines DLc1, DLcg, DLch, DLci, and DLcj arranged in the fourth driving area DDA4. The second to fourth driving areas DDA2 to DDA4 are disposed between the first driving area DDA1 and the fifth driving area DDA5.

Each of the second to fourth driving areas DDA2, DDA3, and DDA4 may be divided into a plurality of block areas. As an example of the present disclosure, each of the second to fourth driving areas DDA2, DDA3, and DDA4 may include four block areas. The second driving area DDA2 includes first to fourth block areas BA1*a*, BA2*a*, BA3*a*, and BA4*a*, and the third driving area DDA3 includes first to fourth block areas BA1*b*, BA2*b*, BA3*b*, and BA4*b*, and the fourth driving area DDA4 includes first to fourth block areas BA1*c*, BA2*c*, BA3*c*, and BA4*c*. The second to fourth driving areas DDA2, DDA3, and DDA4 may have a small delay difference in gate signals for each block area compared to the first and fifth driving areas DDA1 and DDA5.

The second data integrated circuit 420 is connected to the second group of data lines DLa1, DLag, DLah, DLai, and DLaj through the second group of fan-out lines FLa_1, FLa_g, FLa_h, FLa_i, and FLa_j. Here, the second group of the fan-out lines FLa_1, FLa_g, FLa_h, FLa_i, and FLa_j may have the same line resistance.

As shown in FIG. 14, the second group fan-out lines FLa_1, FLa_g, FLa_h, FLa_i, and FLa_j have the same line resistance, and when the delay difference between the gate signals between block areas in the second driving area DDA2 is small (or constant), the second driving area DDA2 may include a flat period. Here, the flat period may be defined as a period in which the delay value of the data voltage is the same. The flat period provided in the second driving area DDA2 may be referred to as a first flat period FMP1. As an example of the present disclosure, the first flat period FMP1 may be formed in the second and third block areas BA2*a* and BA3*a*. Here, the case where the flat period is included has been described as an example in which the fan-out lines have an equal resistance structure and the delay difference between the gate signals is fine (or constant) but the present disclosure is not limited to this. That is, when the delay values of the gate signals are designed to be the same, a flat period may exist even in a section where the delay difference caused by fan-out lines is fine (or constant).

In addition, the third group fan-out lines FLb_1, FLb_g, FLb_h, FLb_i, and FLb_j have the same line resistance, and when the delay difference of the gate signal between the block areas in the third driving area DDA3 is small, the third driving area DDA3 may include a flat period. Here, the flat period provided in the third driving area DDA3 may be referred to as a second flat period FMP2. As an example of the present disclosure, the second flat period FMP2 may be formed in the second and third block areas BA2*b* and BA3*b*.

Finally, the fourth group fan-out lines FLc_1, FLc_g, FLc_h, FLc_i, and FLc_j have the same line resistance, and when the delay difference of the gate signal between the block areas in the fourth driving area DDA4 is small, the fourth driving area DDA4 may include a flat period. Here, the flat period provided in the fourth driving area DDA4 may be referred to as a third flat period FMP3. As an example of the present disclosure, the third flat period FMP3 may be formed in the second and third block areas BA2*c* and BA3*c*.

In the first flat period FMP1, the output time points of the data voltages Dag and Dah may be maintained as the 3.5th time point t3.5, and in the second flat period FMP2, the output time points of the data voltages Dbg and Dbh may be maintained as the 4.5th time point t4.5. In order to prevent a boundary from being visible in the display area due to a delay difference between the first and second flat periods FMP1 and FMP2, a non-flat period in which the delay values of the data voltages are not the same may be provided between the first and second flat periods FMP1 and FMP2. The non-flat period between the first and second flat periods FMP1 and FMP2 may be provided in the fourth block area BA4*a* of the second driving area DDA2 and the first block area BA1*b* of the third driving area DDA3. The data voltages Dai to Daj of the fourth block, which are provided to the fourth block area BA4*a* of the second driving area DDA2, have a first time difference (0.5t/(j-i)) at the 3.5th time point t3.5 and may be sequentially delayed from the i-th data voltage Dai to the j-th data voltage Daj. The data voltages Db1 to Dbg−1 of the first block provided to the first block area BA1*b* of the third driving area DDA3 also may have a first time difference (0.5t/(j-i)) and may be sequentially delayed.

The output time point of the data voltages Dcg and Dch in the third flat period FMP3 may be maintained as the 3.5th time point t3.5. In this case, in order to prevent a boundary from being visible in the display area due to a delay difference between the second and third flat periods FMP2 and FMP3, a non-flat period in which the delay values of the data voltages are not the same may be provided between the second and third flat periods FMP2 and FMP3. The non-flat period between the second and third flat periods FMP2 and FMP3 may be provided in the fourth block area BA4*b* of the third driving area DDA3 and the first block area BA1*c* of the fourth driving area DDA4. The data voltages Dbi to Dbj of the fourth block, which are provided to the fourth block area BA4*b* of the third driving area DDA3, have a second time difference (0.5t/(j-i)) at the 4.5th time point t4.5 and may be sequentially delayed from the j-th data voltage Dbj to the i-th data voltage Dbi. The data voltages Dc1 to Dcg−1 of the first block provided to the first block area BA1*c* of the fourth driving area DDA4 also have a second time difference (0.5t/(j-i)) and may be sequentially delayed.

As such, when each of the driving areas DDA2, DDA3, and DDA4 includes flat periods FMP1, FMP2, and FMP3, a block area reflecting a delay value corresponding to a delay deviation between the flat periods FMP1, FMP2, and FMP3 may be disposed between the flat periods FMP1, FMP2, and FMP3. Therefore, it is possible to prevent the boundary between the flat periods FMP1, FMP2, and FMP3 from being recognized.

Figure 15:
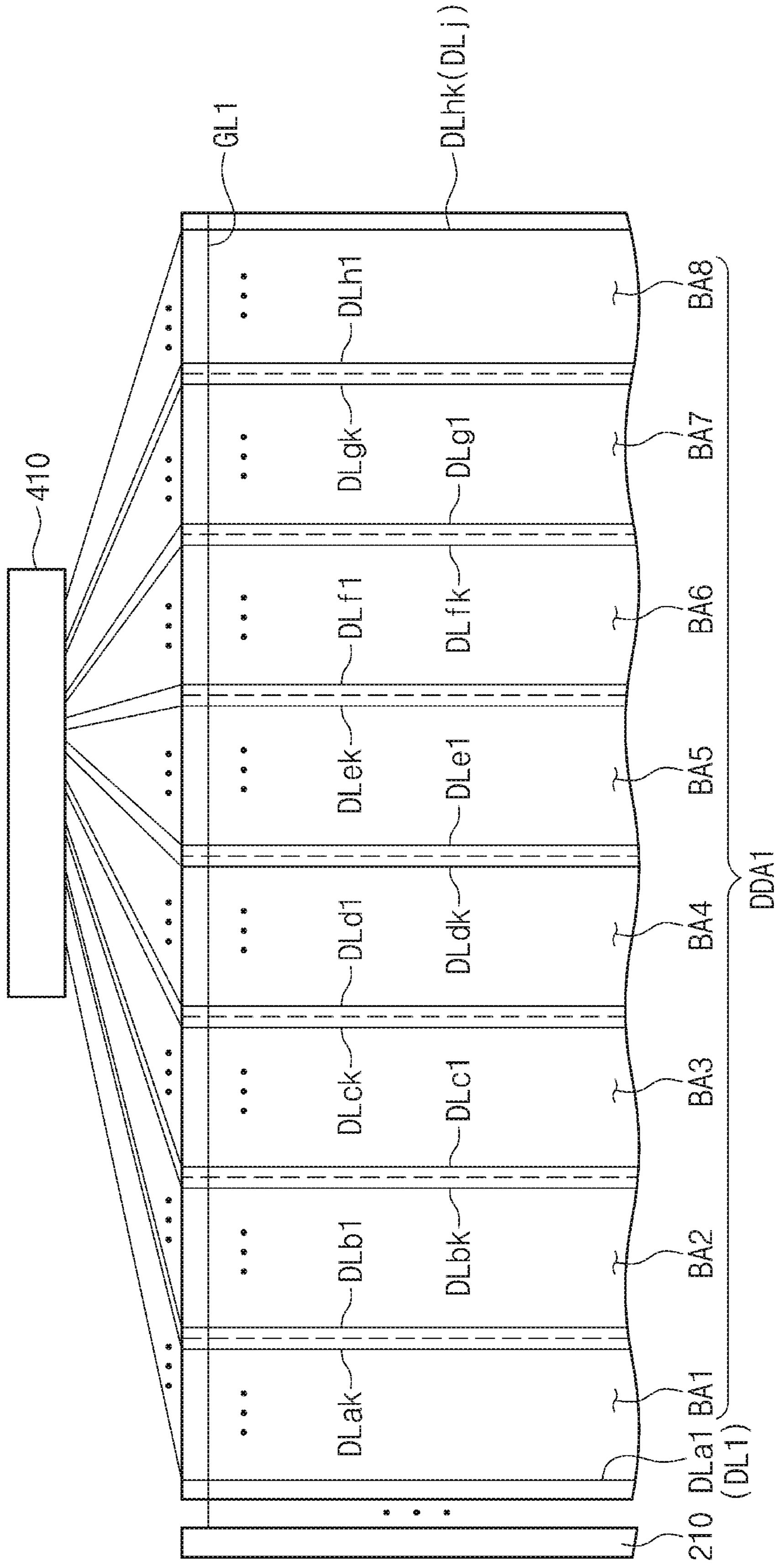
FIG. 15 is an enlarged plan view of a first data integrated circuit and a display panel according to another embodiment of A1 in FIG. 2.
Figure 16:
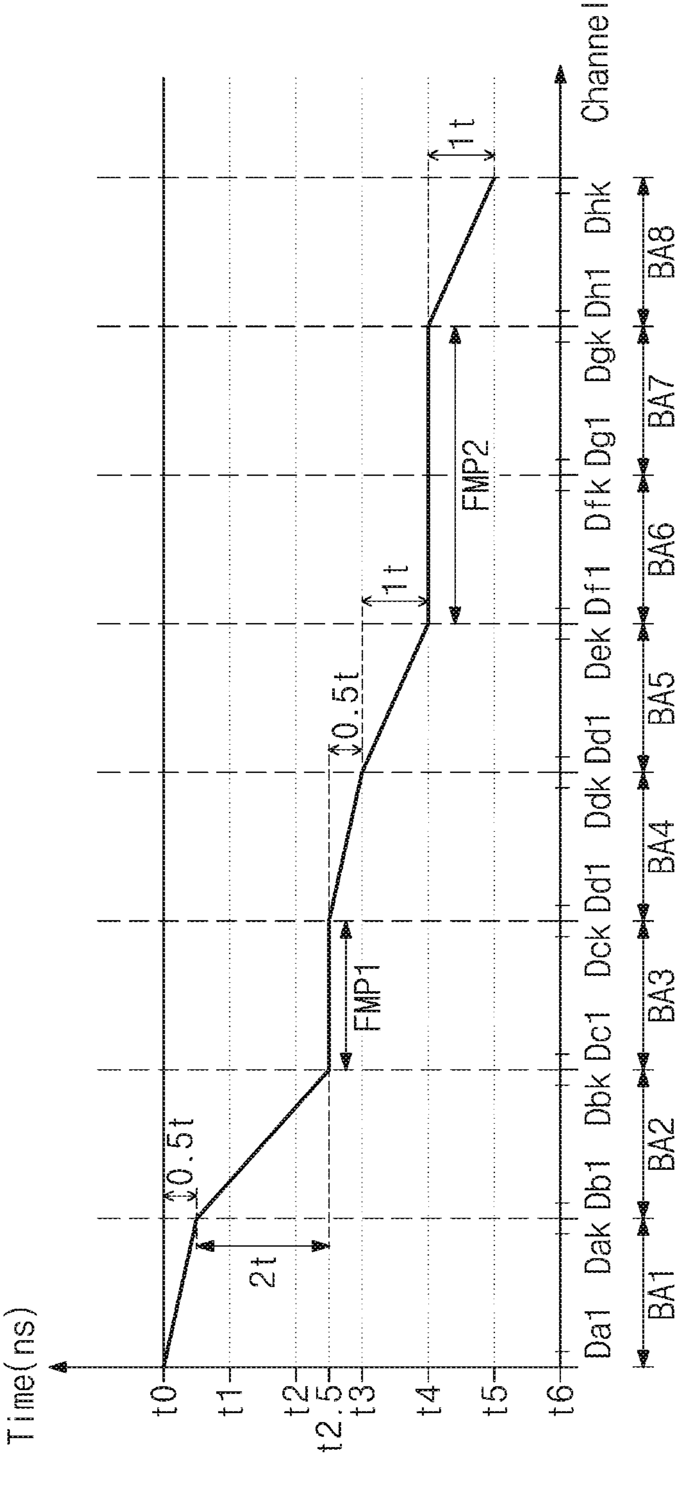
FIG. 16 is a waveform diagram showing output time points of data voltages of first, second, third, fourth, fifth, sixth, seventh, and eighth block areas applied to data lines of first, second, third, fourth, fifth, sixth, seventh, and eighth block areas shown in FIG. 15.

FIG. 15 is an enlarged plan view of a first data integrated circuit and a display panel according to another embodiment of part A1 of FIG. 2 and FIG. 16 is a waveform diagram showing output time points of data voltages of the first to eighth blocks applied to data lines of the first to eighth blocks shown in FIG. 15.

Referring to FIG. 15, the first driving area DDA1 in which the first data line group DL1 to DLj is disposed may be divided into a plurality of block areas. As an example of the present disclosure, the first driving area DDA1 may include eight block areas (hereinafter, first to eighth block areas BA1, BA2, BA3, BA4, BA5, BA6, BA7, and BA8). However, the number of block areas included in the first driving area DDA1 is not limited thereto. For example, the first driving area DDA1 may include 5 to 7 block areas.

The first data line group DL1 to DLj may be divided into a plurality of blocks that are respectively arranged corresponding to a plurality of block areas. As an example of the present disclosure, the first data line group DL1 to DLj includes a first data line block DLa1 to DLak, a second data line block DLb1 to DLbk, a third data line block DLc1 to DLck, a fourth data line block DLd1 to DLdk, a fifth data line block DLe1 to DLek, a sixth data line block DLf1 to DLfk, a seventh data line block DLg1 to DLgk, and an eighth data line block DLh1 to DLhk.

The first data line block DLa1 to DLak is disposed in the first block area BA1, and the second data line block DLb1 to DLbk is disposed in the second block area BA2, and the third data line block DLc1 to DLck is disposed in the third block area BA3, and the fourth data line block DLd1 to DLdk is disposed in the fourth block area BA4. The fifth data line block DLe1 to DLek is disposed in the fifth block area BA5, and the sixth data line block DLf1 to DLfk is disposed in the sixth block area BA6, and the seventh data line block DLg1 to DLgk is disposed in the seventh block area BA7, and the eighth data line block DLh1 to DLhk is disposed in the eighth block area BA8.

Data voltages Da1 to Dak of the first block are supplied to the first data line block DLa1 to DLak disposed in the first block area BA1. Data voltages Db1 to Dbk of the second block are supplied to the second data line block DLb1 to DLbk disposed in the second block area BA2. Here, the data voltages Da1 to Dak of the first block have a first time difference (0.5t/k) at a reference time point t0 and are sequentially delayed from the first data voltage Da1 to the k-th data voltage Dak. On the other hand, the data voltages Db1 to Dbk of the second block have a second time difference (2t/k) at the first time point t1 and are sequentially delayed from the first data voltage Db1 to the k-th data voltage Dbk.

Also, data voltages Dc1 to Dck of the third block are supplied to the third data line block DLc1 to DLck disposed in the third block area BA3. Data voltages Dd1 to Ddk of the fourth block are supplied to the fourth data line block DLd1 to DLdk arranged in the fourth block area BA4. Here, the data voltages Dc1 to Dck of the third block are delayed during the first flat period FMP1 by the same delay value (i.e., as much as the 2.5th time (t2.5-t0)). On the other hand, the data voltages Dd1 to Ddk of the fourth block have a third time difference (0.5t/k) at the 2.5th time point t2.5, and are sequentially delayed from the first data voltage Dd1 to the k-th data voltage Ddk.

Data voltages Del to Dek of the fifth block are supplied to the fifth data line block DLe1 to DLek disposed in the fifth block area BA5. Data voltages Df1 to Dfk of the sixth block are supplied to the sixth data line block DLf1 to DLfk disposed in the sixth block area BA6. Data voltages Dg1 to Dgk of the seventh block are supplied to the seventh data line block DLg1 to DLgk disposed in the seventh block area BA7. Data voltages Dh1 to Dhk of the sixth block are supplied to the eighth data line block DLh1 to DLhk disposed in the eighth block area BA8.

Here, the data voltages Del to Dek of the fifth block have a fourth time difference (1t/k) at the third time point t3 and are sequentially delayed from the first data voltage Del to the k-th data voltage Dek. The data voltages Df1 to Dfk of the sixth block and the data voltages Dg1 to Dgk of the seventh block are delayed during the second flat period FMP2 by the same delay value (i.e., by the fourth time (t4-t0)). On the other hand, the data voltages Dh1 to Dhk of the eighth block have a fifth time difference (1t/k) at the fourth time point t4 and are sequentially delayed from the first data voltage Dh1 to the k-th data voltage Dhk.

As such, one data integrated circuit is divided into a larger number of output blocks, and the delay value of data voltages output from one data integrated circuit can be controlled in units of output blocks. Therefore, it is possible to fine-tune the delay value of the data voltages, and as a result, the variation in the charging rate between pixels can be further reduced.

According to the data driver of the present disclosure and a display device having the same, by controlling the delay value of the data voltages outputted from one data integrated circuit in units of blocks, fine adjustment of the delay value can be enabled such that variation in charging rates between pixels can be reduced.

Although the example embodiments of the present disclosure have been described, it is understood that the present disclosure should not be limited to these example embodiments but various changes and modifications can be made by one ordinary skilled in the art within the spirit and scope of the present disclosure as hereinafter claimed.

What is claimed is:

1. A data driving chip comprising:

a digital to analog converter configured to convert image signal data for a row of pixels into first and second pluralities of data voltages;

an output buffer configured to receive the first and second pluralities of data voltages from the digital to analog converter, the output buffer including a first output block and a second output block which are commonly connected to the digital to analog converter; and only one delay clock generator commonly and directly connected to the first and second output blocks to provide a plurality of first delay clock signals to the first output block and a plurality of second delay clock signals to the second output block, wherein the first output block includes a plurality of first output channels and the second output block includes a plurality of second output channels, wherein the plurality of first delay clock signals have a first phase difference and the plurality of second delay clock signals have a second phase difference different from the first phase difference, wherein the first data voltages outputted from the first output block through the first output channels are delayed with a first time difference, and wherein the second data voltages outputted from the second output block through the second output channels are delayed with a second time difference which is different from the first time difference.

2. The data driving chip of claim 1, wherein the delay clock generator receives a first reference clock that determines a time point at which the first output block outputs the first data voltages and a second reference clock that determines a time point at which the second output block outputs the second data voltages.

3. The data driving chip of claim 2, wherein the delay clock generator outputs the first delay clock signals by reflecting delay information of the first output block to the first reference clock, and outputs the second delay clock signals by reflecting delay information of the second output block to the second reference clock.

4. The data driving chip of claim 3, wherein the first output block outputs the first data voltages with the first time difference corresponding to the first phase difference based on the first delay clock signals, and wherein the second output block outputs the second data voltages with the second time difference corresponding to the second phase difference based on the second delay clock signals.

5. A display device comprising:

a display panel including a plurality of pixels connected to a plurality of gate lines and a plurality of data lines;

a gate driver configured to generate a plurality of gate signals and apply the plurality of gate signals to the plurality of gate lines;

a plurality of data driving chips configured to generate a plurality of data voltages based on image signal data and apply the plurality of data voltages to the plurality of data lines; and a signal controller configured to control the gate driver and the data driving chip and generate the image signal data based on image data, wherein each of the data driving chips includes:

a digital to analog converter configured to convert the image signal data for a row of pixels into first data voltages and second data voltages;

an output buffer including a first output block and a second output block which are commonly connected to the digital to analog converter, the first output block connected to a plurality of first data lines among the data lines and including a plurality of first channels and the second output block connected to a plurality of second data lines among the data lines and including a plurality of second channels; and only one delay clock generator commonly and directly connected to the first and second output blocks to provide a plurality of first delay clock signals to the first output block and a plurality of second delay clock signals to the second output block, wherein the plurality of first delay clock signals have a first phase difference and the plurality of second delay clock signals have a second phase difference different from the first phase difference, wherein the first data voltages outputted from the first output block through the first channels are delayed with a first time difference, and wherein the second data voltages outputted from the second output block through the second channels are delayed with a second time difference which is different from the first time difference.

6. The display device of claim 5, wherein the delay clock generator receives a first reference clock that determines a time point at which the first output block outputs the first data voltages and a second reference clock that determines a time point at which the second output block outputs the second data voltages.

7. The display device of claim 6, wherein the delay clock generator outputs the first delay clock signals by reflecting delay information of the first output block to the first reference clock, and outputs the second delay clock signals by reflecting delay information of the second output block to the second reference clock.

8. The display device of claim 7, wherein the first output block outputs the first data voltages with the first time difference corresponding to the first phase difference based on the first delay clock signals, and wherein the second output block outputs the second data voltages with the second time difference corresponding to the second phase difference based on the second delay clock signals.

9. The display device of claim 6, wherein the signal controller comprises a reference clock generator configured to generate the first and second reference clocks and provide the generated first and second reference clocks to the delay clock generator.

10. The display device of claim 5, further comprising a plurality of fan-out lines connecting the plurality of data lines to the data driving chip, wherein the plurality of fan-out lines have equal line resistance.

11. The display device of claim 5, wherein the gate driver comprises:

a first gate driving circuit connected to a first end of the plurality of gate lines; and a second gate driving circuit connected to a second end of the plurality of gate lines.

12. A display device comprising:

a display panel including a plurality of pixels connected to a plurality of gate lines and a plurality of data lines;

a gate driver configured to generate a plurality of gate signals and apply the plurality of gate signals to the plurality of gate lines; and a plurality of data driving chips configured to generate a plurality of data voltages based on image signal data and apply the plurality of data voltages to the plurality of data lines, wherein each of the plurality of data driving chips includes:

a digital to analog converter configured to convert the image signal data for a row of pixels into first data voltages, second data voltages, and third data voltages;

an output buffer including a first output block, a second output block, and a third output block which are commonly connected to the digital to analog converter, the first output block connected to a plurality of first data lines among the data lines and including a plurality of first channels, the second output block connected to a plurality of second data lines among the data lines and including a plurality of second channels, the third output block connected to a plurality of third data lines among the data lines and including a plurality of third channels; and only one delay clock generator commonly and directly connected to the first to third output blocks to provide a plurality of first delay clock signals to the first output block, a plurality of second delay clock signals to the second output block and a plurality of third delay clock signals to the third output block, wherein the plurality of first delay clock signals have a first phase difference, the plurality of second delay clock signals have a second phase difference different from the first phase difference, and the plurality of third delay clock signals does not have phase difference, wherein the first data voltages outputted from the first output block through the first channels are delayed with a first time difference, wherein the second data voltages outputted from the second output block through the second channels are delayed with a second time difference which is different from the first time difference, and wherein the third data voltages outputted from the third output block through the third channels have an equal first delay value.

13. The display device of claim 12, wherein each of the plurality of data driving chip further includes a fourth output block connected to a plurality of third data lines among the data lines and including a plurality of third channels, fourth data voltages outputted from the third output block have an equal second delay value, and wherein the first delay value is different from the second delay value.

14. The display device of claim 13, wherein at least one of the first and second output blocks is disposed between the third output block and the fourth output block.

15. The display device of claim 12, further comprising a plurality of fan-out lines connecting the plurality of data lines to the data driving chips, wherein the plurality of fan-out lines have equal line resistance.

* * * * *